(12) United States Patent
Schwartz et al.

(10) Patent No.: US 12,226,959 B2
(45) Date of Patent: Feb. 18, 2025

(54) SYSTEM AND METHOD FOR FABRICATING A CUSTOM FACE MASK

(71) Applicant: Desprez, LLC, New London, NH (US)

(72) Inventors: Jonathan Schwartz, New York City, NY (US); Oliver Ortlieb, New York City, NY (US); Max Friefeld, New York City, NY (US); Charlie Fenwick, New York City, NY (US)

(73) Assignee: Desprez LLC, New London, NH (US)

( * ) Notice: Subject to any disclaimer, the term of this patent is extended or adjusted under 35 U.S.C. 154(b) by 882 days.

(21) Appl. No.: 17/381,871

(22) Filed: Jul. 21, 2021

(65) Prior Publication Data

US 2022/0024139 A1    Jan. 27, 2022

Related U.S. Application Data

(60) Provisional application No. 63/058,962, filed on Jul. 30, 2020, provisional application No. 63/054,732, filed on Jul. 21, 2020.

(51) Int. Cl.
*B29C 64/393*     (2017.01)
*A41D 13/11*      (2006.01)
(Continued)

(52) U.S. Cl.
CPC ........ *B29C 64/393* (2017.08); *A41D 13/1107* (2013.01); *A62B 18/02* (2013.01);
(Continued)

(58) Field of Classification Search
CPC ....... B29C 64/393; B29C 51/18; B33Y 50/02; B33Y 80/00; G06F 30/27; G06F 2113/10;
(Continued)

(56) References Cited

U.S. PATENT DOCUMENTS 8,226,395 B2    7/2012  Pax et al.
2014/0156053 A1*  6/2014  Mahdavi ............... B29C 64/112
                                                      700/119
(Continued)

FOREIGN PATENT DOCUMENTS

CN    104203547        12/2014
WO    2016088118 A1     6/2016
WO    2016150409 A1     9/2016

*Primary Examiner* — Jamil Ahmed
(74) *Attorney, Agent, or Firm* — Caldwell Intellectual Property Law

(57) ABSTRACT

A system and method for fabricating a custom face mask. The system includes a factory client, wherein the factory client includes a computing device configured to receive, at a factory server and at least a user device, an image datum comprising a plurality of data of a face of a user. The computing device is further configured to map, as a function of a first machine-learning model, at least a facial landmark to a three-dimensional (3D) mesh of the image datum, map, as a function of a second machine-learning mode, a path to the 3D mesh including a boundary of a custom face mask configured for use on a user's face, generate a model file of a mold, instruct a manufacturing tool, and instruct a manufacturing device to thermoform the plastic component of the mold.

20 Claims, 14 Drawing Sheets

(51) Int. Cl.
| | |
|---|---|
| *A62B 18/02* | (2006.01) |
| *B29C 51/18* | (2006.01) |
| *B33Y 50/02* | (2015.01) |
| *G05B 19/414* | (2006.01) |
| *G06F 30/27* | (2020.01) |
| *G06T 17/20* | (2006.01) |
| B29L 31/48 | (2006.01) |
| B33Y 80/00 | (2015.01) |
| G06F 113/10 | (2020.01) |

(52) U.S. Cl.
CPC .............. *B29C 51/18* (2013.01); *B33Y 50/02* (2014.12); *G05B 19/4145* (2013.01); *G06F 30/27* (2020.01); *G06T 17/20* (2013.01); B29L 2031/4835 (2013.01); B33Y 80/00 (2014.12); G06F 2113/10 (2020.01); *G06T 2200/04* (2013.01)

(58) Field of Classification Search
CPC ................ A41D 13/1107; A62B 18/02; G05B 19/4145; G06T 17/20; G06T 2200/04; B29L 2031/4835
See application file for complete search history.

(56) References Cited

U.S. PATENT DOCUMENTS

| | | |
|---|---|---|
| 2015/0197060 A1 | 7/2015 | Carr et al. |
| 2016/0107380 A1 | 4/2016 | Smoot et al. |

\* cited by examiner

SYSTEM AND METHOD FOR FABRICATING A CUSTOM FACE MASK

CROSS-REFERENCE TO RELATED APPLICATIONS

This application claims the benefit of priority of U.S. Provisional Patent Application Ser. No. 63/054,732, filed on Jul. 21, 2020, and titled "Method for Fabricating a Custom Face Mask", which is incorporated by reference herein in its entirety. This application also claims the benefit of priority of U.S. Provisional Patent Application Ser. No. 63/058,962, filed on Jul. 30, 2020, and titled "Method for Fabricating a Custom Face Mask", which is incorporated by reference herein in its entirety.

FIELD OF THE INVENTION

The present invention generally relates to the field of manufacturing. In particular, the present invention is directed to a system and method for fabricating a custom face mask.

BACKGROUND

Typically, face masks are used as a personal protective equipment that a user can wear to prevent contact with, inhalation of, and/or spread of unwanted airborne particles. Current face masks are manufactured as a commodity and so are exclusively manufactured to fit a single mold that may be a default size designed to fit on a variety of faces of users with varying facial features. However, since every person has unique facial features and shapes, a common face mask may not properly prevent unwanted airborne particles to come into contact with a user's mouth and nose if the face mask does not cover the user's nose and mouth precisely. Many users may attempt to wear such face mask too tightly and pressed to a user's face to prevent a high percentage of unwanted airborne particles from coming into contact with user's face and nose or entering the nose or mouth. This may further cause pain or discomfort to a wearer when wearing the face mask for a long period of time. Users may also create or handmake their own face masks with varying quality of fabrics that may not be designed to effectively prevent unwanted airborne particles from coming into contact with a user's face or penetrating the face mask itself.

SUMMARY OF THE DISCLOSURE

In an aspect, a system for fabricating a custom face mask includes a factory client, factory client comprising a computing device, the computing device configured to receive, at a factory server, an image datum and at least a user device, the image datum comprising a plurality of data of a face of a user, map, as a function of a first machine-learning model, at least a facial landmark to a three-dimensional (3D) mesh of the image datum, map, as a function of a second machine-learning mode, a path to the 3D mesh, the path comprising a boundary of a custom face mask configured for use on a user's face, wherein the second machine-learning model is trained using training data, the training data including a plurality of facial landmark examples and a plurality of boundary examples, generate a mold model file, the mold model file comprising the custom face mask mesh, as a function of the path to the 3D mesh and the 3D mesh of the image datum from the first machine-learning model and second machine-learning model, generate a manufacturing instruction set as a function of the mold model file and the custom face mask mesh, instruct a manufacturing device, manufacturing device configured to create the mold as a function of the model file, and thermoform the plastic component as a function of the manufacturing device.

In another aspect, a method for fabricating a custom face mask includes receiving, at a factory server, an image datum, image datum comprising, a plurality of data of a face of a user, mapping, as a function of a first machine-learning model, at least a facial landmark to a three-dimensional (3D) mesh of the image datum, mapping, as a function of a second machine-learning mode, a path to the 3D mesh, the path comprising a boundary of a custom face mask configured for use on a user's face, wherein the second machine-learning model is trained using training data, the training data including a plurality of facial landmark examples and a plurality of boundary examples, generating a mold model file, the mold model file comprising a custom face mask mesh, as a function of the path to the 3D mesh and the 3D mesh of the image datum, generating a manufacturing instruction set as a function of the mold model file and the custom face mask mesh, instructing a manufacturing device, manufacturing device configured to create the mold as a function of the model file, and thermoforming, as a function of the manufacturing device, a plastic component of the mold.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, the present disclosure is directed to systems and methods for fabricating a custom face mask. Embodiments described in this disclosure include a factory client, wherein the factory client includes a computing device, wherein the computing device is configured to receive, at a factory server and at least a user device, an image datum, image datum comprising, a plurality of data of a face of a user, map, as a function of a first machine-learning model, at least a facial landmark to a three-dimensional (3D) mesh of the image datum, map, as a function of a second machine-learning mode, a path to the 3D mesh, the path including a boundary of a custom face mask configured for use on a user's face, using training data, training data including the at least the facial landmark, and at least the boundary of the custom face, generate a model file of a mold, the mold including the custom face mask, as a function of the path to the 3D mesh and the 3D mesh of the image datum, instruct a manufacturing tool, manufacturing tool configured to create the mold as a function of the model file, and instruct a manufacturing device, manufacturing device to thermoform the plastic component of the mold. The custom face mask is configured to be unique to each user and be fitted onto a user's face comfortably with minimal wiggle room.

Figure 1:
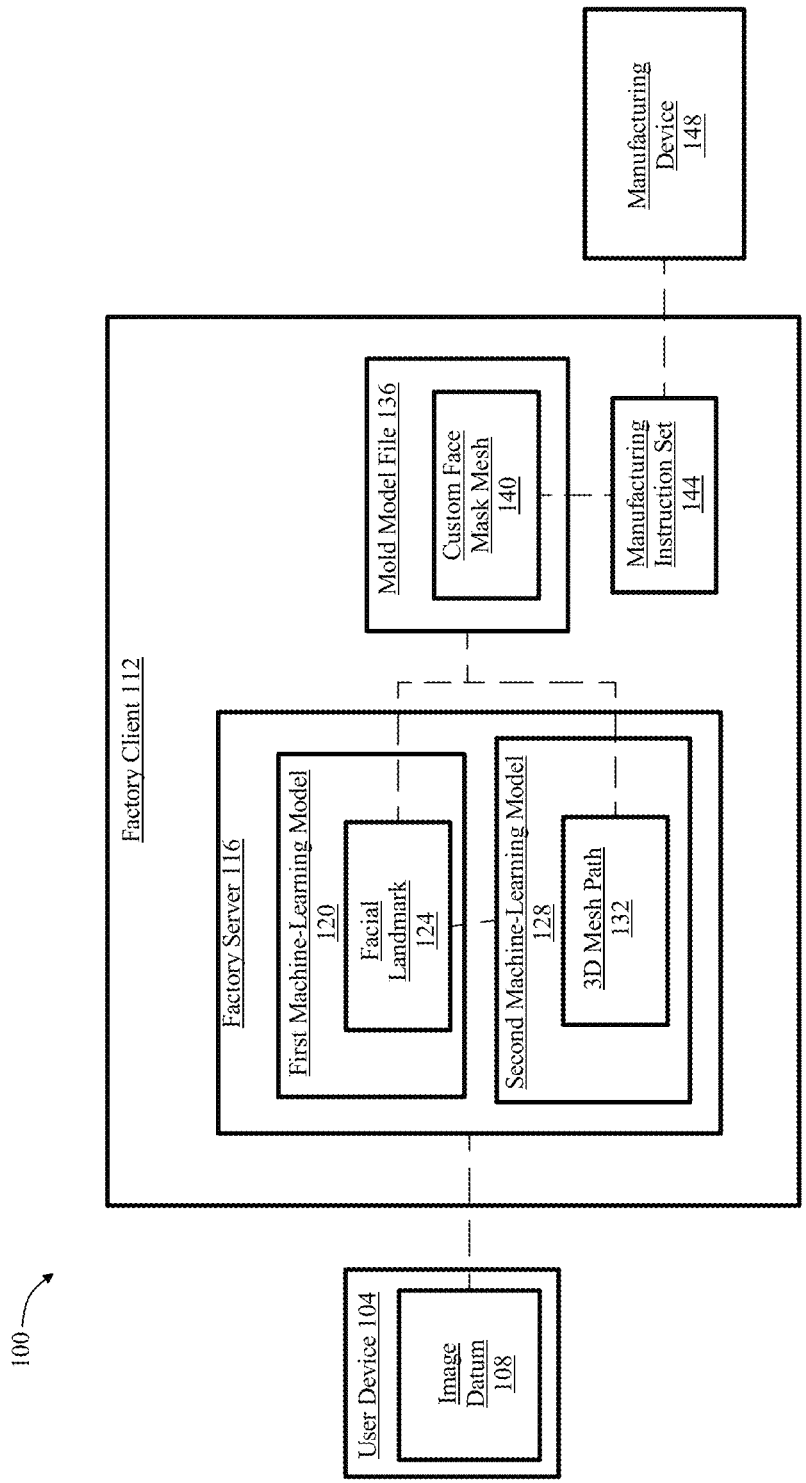
FIG. 1 is a block diagram of an exemplary embodiment of a system for an automated manufacturing environment.

Referring now to FIG. 1, a block diagram of an exemplary embodiment of a system 100 for an automated manufacturing environment is presented. The system 100 may contain a user device. User device 104 may be configured to, without limitation, transfer a transmission of communication to a factory client 112. Transmission may include any transmission as described herein. For example and without limitation, transmission may include file transfer protocols such as File Transfer Protocol (FTP), Hypertext Transfer Protocol (HTTP), SSH File Transfer Protocol (SFTP), Secure Copy (SCP), Accelerated File Transfer Protocol (AFTP), and the like. User device 104 may include an additional computing device, such as a mobile device, laptop, desktop computer, tablet, and the like. In a non-limiting embodiment, user device 104 may be a computer and/or workstation operated by an engineering professional. Persons skilled in the art, upon reviewing the entirety of this disclosure, will be aware of various devices which may be suitable for use as user client device consistently with this disclosure. In a non-limiting embodiments two or more user devices may be in communication with factory client 112 and each be configured to transmit a transmission of data, wherein the data may include data relevant to the inspection design, such as critical dimensions requiring measurements and tolerances. In a non-limiting embodiment, a user device 104 may present a user interface through, for example, a display such as a screen or projector and/or through an audio device such as speakers or headphones. A user device 104 may accept inputs through one or more input devices such as, for example, a keyboard, mouse, pointer, touch screen, or microphone.

With continued reference to FIG. 1, system 100 may include a factory client 112 that may be configured to receive an image datum 108 as a function of the user device 104. Image datum 108 may include a plurality of data of a face of a plurality of users. "Image datum", for the purposes of this disclosure, refer to any data describing and/or relating to a plurality of physical features of a face of a user. The image datum 108 may include a plurality of data describing a user's face and may be a three-dimensional (3D) scan point cloud or a one or more two-dimensional (2D) images. In a non-limiting embodiment, image datum 108 may include facial features including, but not limited to, size and shape of the entirety of a user's face and the like. Image datum 108 may include a three-dimensional model of a boundary, wherein the boundary may include an area encompassing the nose and mouth of a face, to be manufactured. Image datum 108 may include any data describing and/or relating to a three-dimensional model of a mechanical part, a non-functional part, a non-mechanical part, a cosmetic part, and/or any combination thereof, wherein the part is to be manufactured. Image datum 108 may include a 3D scan point cloud of a user's face. "3D scan point cloud," for the purposes of this disclosure, refer to a three-dimensional digital representation of an object include at least a user's face and may be captured via a mobile application that uses photogrammetry. Photogrammetry may be used to compile images at varying angles into a 3D scan point cloud. In a non-limiting embodiment, a user may use a camera to capture an image of the user's face, or the user may use an existing image of the user's face representing the image datum 108 that may be transmitted by a user device 104 to a factory client 112 for processing.

With continued reference to FIG. 1, system 100 may include a factory client 112 to receive image datum 108 as a function of a user device 116. Factory client 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Factory client 112 may include a single computing device operating independently, or may include two or more computing device operating in concert, in parallel, sequentially or the like; two or more computing devices may be included together in a single computing device or in two or more computing devices. Factory client 112 may interface or communicate with one or more additional devices as described below in further detail via a network interface device. Network interface device may be utilized for connecting factory client 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Factory client 112 may include but is not limited to, for example, a computing device or cluster of computing devices in a first location and a second computing device or cluster of computing devices in a second location. Factory client 112 may include one or more computing devices dedicated to data storage, security, distribution of traffic for load balancing, and the like. Factory client 112 may distribute one or more computing tasks as described below across a plurality of computing devices of computing device, which may operate in parallel, in series, redundantly, or in any other manner used for distribution of tasks or memory between computing devices. Factory client 112 may be implemented using a "shared nothing" architecture in which data is cached at the worker, in an embodiment, this may enable scalability of system 100 and/or computing device.

With continued reference to FIG. 1, factory client 112 may be designed and/or configured to perform any method, method step, or sequence of method steps in any embodiment described in this disclosure, in any order and with any degree of repetition. For instance, factory client 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Factory client 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, factory client 112 may include a factory server 116. Factory server 116 may include any hardware and/or software module. Factory server 116 is configured to orient, by an automated operator, the image datum 108 within an automated manufacturing system 100. Automated operator, as used herein, is a person, hardware, and/or software which engages in any step and/or combination of steps of the manufacturing process of at least a mechanical part which may include a model of a custom face mask based off at least an image datum 108. A step of the manufacturing process may include, for example and without limitation, receiving an image datum 108 from a user device 104, orienting the image datum within a representative inspection system, and/or any step utilizing at least a machine-learning model. For example and without limitation, an automated operator may include a person interacting with system 100, wherein a person may further include a custom face mask manufacturer who builds the fixture model and specifies measurements, a floor operator running the CMM using the program and fixtures created by the designer, and the like. In a non-limiting embodiment, a user may use a user device 104 to interact with factory server 116 through a user interface. In a non-limiting embodiment, a user interface may enable the user to request parts, input image datum or measurements, and monitor the status of the parts through fabrication and delivery. In various embodiments, a user interface may be implemented as a web-based interface provided by the factory server 116 and accessible via a web browser application on the user device 104, a user interface in a native application executing on the user device 104, some combination of the two (e.g., a WebView object within a native application), or some other type of interface that is accessible on the user device 104.

Still referring to FIG. 1, factory server 116 from factory client may include a first machine-learning model 120. Factory server 116 may use first machine-learning model 120 to map at least a facial landmark 124 to a 3D mesh of the image datum 108. Factory client 112 may receive training data for training the first machine-learning model 120. Receiving such training data may include training examples correlating image data as described herein to 3D mesh data; such examples may be entered by users and/or derived from earlier iterations of methods and/or method steps as described in this disclosure. First machine-learning model 120 may include any machine-learning algorithm such as K-nearest neighbors algorithm, a lazy naïve Bayes algorithm, and the like, machine-learning process such as supervised machine-learning, unsupervised machine-learning, or method such as neural nets, deep learning, and the like, as described in further detail below. First machine-learning model 120 may be trained to derive an algorithm, function, series of equations, or any mathematical operation, relationship, or heuristic, that can automatedly accept an input of image datum 108 and generate an output of a mapping of a facial landmark 124 to the 3D mesh of the image datum. "3D mesh," for the purposes of this disclosure, refer to any 3D mesh including a structural build of a 3D model consisting of polygons. 3D meshes may use reference points in X, Y and Z axes to define shapes with height, width, and depth. 3D mesh may include a polygon mesh which may further include a collection of vertices, edges and faces that defines the shape of a polyhedral object. The faces may consist of triangles (triangle mesh), quadrilaterals (quads), or other simple convex polygons (n-gons). In a non-limiting embodiment, polygon mesh may use convex polygons for the purposes of simplifying the rendering of an image datum for generating a model of a custom face mask, but may also be more generally composed of concave polygons, or even polygons with holes 3D meshes may created by, but not limited to, an operator, automated operator, or the like, using software packages and/or commercial suites. First machine-learning model 120 may derive individual functions describing unique relationships observed from the image datum training data for each data of faces of a user from image datum 108, wherein different relationships may emerge between faces and face cohorts such as subsets of alike faces, smooth users, rugged faces, faces of children, and the like. First machine-learning model 120 may include any number of parameters, numerical values, strings, functions, mathematical expressions, text, and the like. First machine-learning model 120 may become increasingly more complete, and more robust, with larger sets of image datum 108.

With continued reference to FIG. 1, factory server 116 may be configured to map a 3D mesh path 132 to the 3D mesh using a second machine-learning model 128 wherein the second machine-learning model 128 is trained on at least a 3D mesh mapped with a path representing the faces with a distribution of at least a facial landmark 124 from the image datum and at least the first machine learning model 120. "3D mesh path," for the purposes of this disclosure, refers to a path which represents a continuous boundary of a custom face mask on a user's face. In a non-limiting embodiment, the path, once mapped to a 3D mesh, may form an outline of where the custom face mask to be generated will be in contact with the individual's face to maintain a seal with and sit flush against the individual's face. Sitting flush may include the custom face mask that may be placed on a user's face to have a height difference between the two surfaces to be close to zero. The second machine-learning model 128 may be trained as a function of the first machine-learning model 120. Training data may include a plurality of facial landmark examples and a plurality of correlated boundary examples; such examples may be provided, along with correlations therebetween, by users, and/or derived from previous iterations of methods and/or method steps as disclosed in this disclosure.

Still referring to FIG. 1, the system 100 includes factory client 116 to be configured to generate a mold model file 136, as a function of the 3D mesh path 132 and at least a custom face mask mesh 140 which may include a 3D mesh from at least the first machine-learning model 120 and at least the second machine-learning model 128. Mold model file 136 may include, a 3D modeling format used by any Computer Aided Three Dimensional Interactive Application, wherein the application may then be used for building molds, dies, composites, and other types of models. In a non-limiting embodiment, a user may interact with a user interface to complete a part request for a part specifying attributes of one or more parts to be manufactured. As referred to herein, a part request is a request for a part submitted by a customer. In one example implementation, a part request may request a custom face mask, which is a face covering customized for the unique features and curvature of an individual's face. The part request includes image datum of the customer's (or another human's or a non-human's, i.e., a dog's, a cat's, etc.) face, customer contact information, a requested deadline, colors for nontransparent parts of the custom face mask, and a quantity of the custom face masks. In further embodiments the part request further includes customization options, such as the inclusion of text or an image on a portion of the custom face mask, a strap type for a strap of the custom face mask, a shape/pattern of the filtering housings, a shape of a plastic component of the custom face mask, and a shape of the strap holes. In a non-limiting embodiment, a user request may include a model file of a part, customer contact information, a requested deadline, part colors, and part quantity. In another example implementation, a part request includes a three dimensional (3D) model file of the part, model scale information (e.g., a distance unit), customer contact information, a requested deadline, a part material, a part color, and a quantity of the part. As another example, the part request omits a model file and instead includes descriptive information, such as a written description, images, videos, or a combination thereof, depicting the customer's conception of a requested part. In this example, the part request may alternatively be referred to as a design request, and a factory operator such as a designer or artist may review the design request and convert the descriptive information of the part into a model file for use in manufacturing.

Still referring to FIG. 1, the mold model file 136 may be configured to generate a manufacturing instruction set 144 that may use for the custom face mask mesh 140 form the mold model file 136 to be manufactured. Manufacturing instruction set 144 may include a data structure containing a set of instructions for a manufacturing device 148 to follow. In a non-limiting embodiment, manufacturing instruction set 144 may contain electrical signals and values for an automated operator to follow. In a non-limiting embodiment, factory server 116 converts model files specifying a part's geometry, which are irrespective of manufacturing tool, into manufacturing instructions usable by a particular type of manufacturing tool (e.g., manufacturing device 148) to fabricate the part. The model file may be a three-dimensional (3D) model specifying the geometrical layout of a part using, for example, a mesh, surfaces, vectors, or a combination thereof. The manufacturing instructions (e.g., G-code) are readable by the manufacturing tool (or an operator thereof) and are specified in terms of elementary operations to at least partially fabricate the part. In the example of 3D printing, the manufacturing instructions specify positions for a tool head to extrude material for sequentially fabricating a part's layers]]. In a non-limiting embodiment, manufacturing instruction set may include at least a software program to be run on a manufacturing device. In a non-limiting embodiment, conversion of the model file to manufacturing instructions depends at least in part on manufacturing settings. Manufacturing settings depend on the type of manufacturing tool (e.g., the type of manufacturing device 148) and may be specified at least in part by a customer's part request. For example, the part request specifies one or more colors for the part as well as a material (e.g., plastic, rubber, metal) for the part. The factory server 116 may configure manufacturing settings for manufacturing a part specified by a model file. Configuring manufacturing settings includes the factory server 116 determining tool-specific manufacturing settings that correspond to tool properties of a particular manufacturing tool. For example, the factory server 116 uses the tool properties of manufacturing device 148 such as build volume, build volume dimensions, build plate dimensions, or print resolution to determine tool-specific manufacturing settings such as print layer thickness, print orientation, or plate layout.

Still referring to FIG. 1, system 100 may include the factory client 112 to be configured to transmit a manufacturing instruction set 144 to a manufacturing device 148. The manufacturing device 148 may include, but not limited to, a thermoformer, a printer, and the like. Thermoformer may include any manufacturing device that may support the manufacturing process where a at least plastic sheet is heated to a pliable forming temperature, formed to a specific shape in a mold, and trimmed to create a usable product. The sheet, or "film" when referring to thinner gauges and certain material types, is heated in an oven to a high-enough temperature that permits it to be stretched into or onto a mold and cooled to a finished shape. Thermoforming may require the use of at least pressure formers or vacuum formers. It may further require a three or four-station Rotary Transformer. A secondary operation of the process may require CNC robotic routers. In a non-limiting embodiment, a bed for this piece of equipment does not exceed 60"×120". Thermoforming may include a tooling process wherein the tooling process requires machine aluminum molds, cast aluminum molds, composite or temporary molds, or male/female molds. The manufacturing device 148 may be configured to thermoform a custom face mask as a function of at least the manufacturing instruction set 144. The custom face mask may include a replica of the 3D custom face mask mesh 140.

Still referring to FIG. 1, the manufacturing device 148 may include any manufacturing tool that fabricates a part using additive manufacturing techniques such as fused deposition modeling, stereolithography, laser sintering, or laser melting. The manufacturing device may fabricate a part using one or more materials including plastic, thermoplastic, resin, rubber, metal, other materials, or a combination thereof. In a non-limiting embodiment, manufacturing device 148 may include a build plate that supports the base (e.g., top, bottom, side); one or more directional tools to control formation of the part; and an actuator to move the build plate relative to the directional tools or vice versa. For instance, in fused deposition modeling, the directional tool includes a nozzle that extrudes material onto a portion of the part. In stereolithography, an example directional tool includes a laser and one or more mirrors directing the laser onto a portion of the part. In a non-limiting embodiment, directional tool in stereolithography may include a projector forming a variable pattern on the part. The manufacturing device 148 may use manufacturing instructions from factory server 116 to fabricate one or more parts.

Still referring to FIG. 1, the custom mask thermoformed from the manufacturing device 140 may include the factory server 116 to additionally instruct a computer numerical control machine (CNC) to trim the plastic component from the mold and filter holes from the plastic component for the custom face mask. Aside from the plastic component, the custom face mask also comprises one or more filters that each sit in filter housings inserted in the filter holes of the plastic component. In some embodiments, the custom face mask also comprises a mask housing that sits around the edges of the plastic component, and the factory server may instruct a 3D printer to print the mask housing and the filter housings. In further embodiments, the mask housing includes two strap holes for connecting a strap used to secure the custom face mask to the individual's face.

Figure 2:
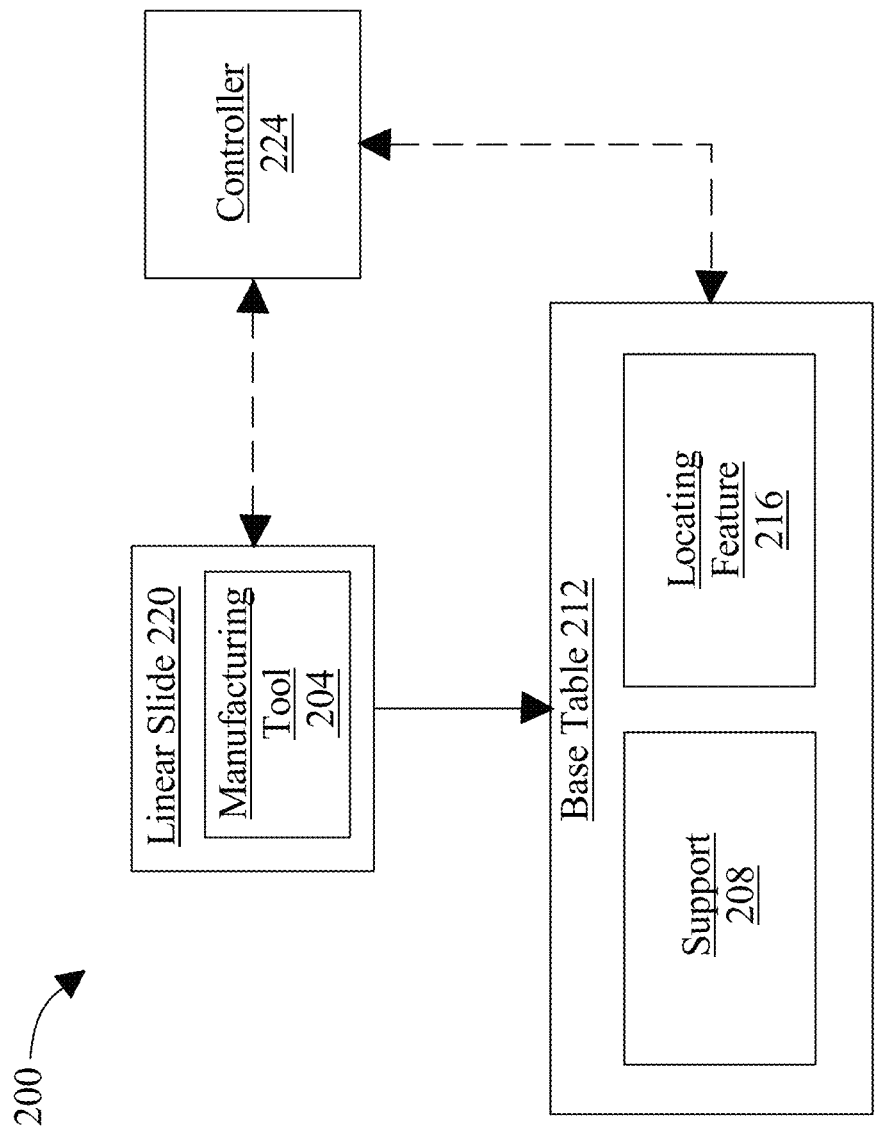
FIG. 2 is a schematic diagram illustrating an exemplary embodiment of a manufacturing device.

Turning now to FIG. 2, an exemplary embodiment of a manufacturing device 200 that may be used in some embodiments to perform one or more manufacturing or computer modeling steps in embodiments of systems and methods such as without limitation system 100 and/or method 700 is illustrated. Manufacturing device 200 may include at least a manufacturing tool 204; in an embodiment, manufacturing tool 204 may be a component of manufacturing device 200 that performs one or more manufacturing steps as described above. Manufacturing tool 204 may perform one or more subtractive manufacturing steps as described above. Manufacturing tool 204 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate.

Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device to use more than one endmill in a single automated manufacturing process. Manufacturing tool 204 may include a tool changer that can switch a plurality of endmills onto and off of manufacturing tool 204. Manufacturing tool 204 may include a component used to perform EDM, such as a wire for wire EDM or an electrode. Manufacturing tool 204 may include one or more lasers. Manufacturing tool 204 may include one or more abraders.

Alternatively or additionally, manufacturing tool 204 may include at least an additive manufacturing tool capable of performing one or more additive manufacturing steps as described above. Manufacturing tool 204 may, as a non-limiting example, include one or more additive printer heads such as those used in rapid prototyping and/or "3D printing" processes, or the like. Manufacturing tool 204 may include an extruding device for extruding fluid or paste material, a sprayer or other applicator for bonding material, an applicator for powering, a sintering device such as a laser, or other such material. Furthermore, discrete object may be formed from precursor to a discrete object 304 by additive manufacturing.

Still referring to FIG. 2, manufacturing device 200 may include a support 208. In an embodiment, a support 208 may be a structure that supports a workpiece during the one or more manufacturing steps. Support 208 may include a base table 212. Base table 212 may include a surface to which a workpiece or other components may be secured. Surface may be oriented horizontally, vertically, or in any other orientation. Surface may be substantially planar. Base table 212 may include various mechanisms to attach components or workpieces to base table 212; for instance, base table 212 may include a quick release attachment mechanism that can be used to attach any component having appropriate attachment features such as quick-release studs.

Support 208 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing device 200 by a plurality of fixtures, such as a plurality of bolts. Support 208 may include a vise, clamp, or other component used to locate or immobilize a workpiece within or at manufacturing device 200.

With continued reference to FIG. 2, manufacturing device 200 may include at least a locating feature 216. In an embodiment, at least a locating feature 216 may be at least a feature of manufacturing device 200 that enables a workpiece to be located at manufacturing device 200; in some embodiments, the at least a locating feature 216 enables a workpiece to be located precisely with regard to a coordinate system used to direct the one or more steps. At least a locating feature 216 may include, without limitation, one or more vices, clamps, projections, slots, recesses, or walls; for instance, the at least a locating feature 216 may include a surface of a vise jaw that is immobile with respect to another component such as a support 208 or base table 212, enabling precise prediction of surface's location, and thus of a workpiece surface set against it. At least a locating feature 216 may include a locating feature 216 on support 208; for example, the at least a locating feature 216 may include a bolt-hole, stud-hole, groove, or other recess in a base table 212, trunnion table, or fixture. As a non-limiting example, at least a locating feature 216 may include one or more grooves in a vice. At least a locating feature 216 may include a projection on a base table 212, trunnion table, or fixture. At least a locating feature 216 may include a combination of recesses and projections. The at least a locating feature 216 may include a plurality of locating features, or a single locating feature.

Continuing to refer to FIG. 2, in an embodiment, manufacturing device 200 may be a mechanical manufacturing device. In an embodiment, mechanical manufacturing device may be a manufacturing device 200 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide 220 or similar device, so that the only decision the user may make is to raise or lower the manufacturing tool 204; as a non-limiting example, where manufacturing device 200 is a manually operated machine tool, user may only be able to raise and lower a cutting tool, and have no ability to move the cutting tool horizontally. Similarly, where manufacturing tool 204 includes a slide lathe, a blade on the slide lathe may be constrained to follow a particular path. As a further example, base table 212 may be moveable along one or more linear axes; for instance, base table 212 may be constrained to move along a single horizontal axis. In other embodiments, base table 212 is constrained to movement along two horizontal axes that span two dimensions, permitting freedom of movement only in a horizontal plane; for instance, base table 212 may be mounted on two mutually orthogonal linear slides.

With continued reference to FIG. 2, manufacturing device 200 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, waterpower, pneumatic power, or hydraulic power. Powered components may include any components of manufacturing device 200. Manufacturing tool 204 may be powered; for instance, manufacturing tool 204 may include an endmill mounted on a spindle rotated by a motor (not shown). Workpiece support 208 may be powered. Where manufacturing device 200 is a mechanical device, motion of components along linear or rotary constraints may be powered; for instance, motion of base table 212 along one or more linear constraints such as linear slides may be driven by a motor or other source of power. Similarly, rotation of a table may be driven by a power source. Tool-changer, where present, may be driven by power. In some embodiments, all or substantially all of the components of manufacturing device 200 are powered by something other than human power; for instance, all components may be powered by electrical power.

Still referring to FIG. 2, manufacturing device 200 may include an automated manufacturing device. In some embodiments, an automated manufacturing system is a manufacturing device including a controller 224 that controls one or more manufacturing steps automatically. Controller 224 may include a sequential control device that produces a sequence of commands without feedback from other components of subtractive manufacturing device.

Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device.

Continuing to refer to FIG. 2, controller 224 may include a component embedded in manufacturing device 200; as a non-limiting example, the controller 224 may include a microcontroller, which may be housed in a unit that combines the other components of manufacturing device 200. Further continuing the example, microcontroller 224 may have program memory, which may enable microcontroller 224 to load a program that directs manufacturing device 200 to perform an automated manufacturing process. Similarly, controller 224 may include any other components of a computing device as described below in reference to FIG. 17 in a device housed within manufacturing device 200. In other embodiments, controller 224 includes a computing device that is separate from the rest of the components of manufacturing device 200; for instance, the controller 224 may include a personal computer, laptop, or workstation connected to the remainder of manufacturing device 200 by a wired or wireless data connection. As a non-limiting example, automated manufacturing device may include a controller 224, which may be coupled to other features thereof via network; in an embodiment, controller 224 may not be currently coupled to other materials, such that automated manufacturing device may include only controller. In some embodiments, controller 224 includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller 224, which may include one or more computing devices, may be connected to or incorporated in a manufacturing device 200 as described above.

With continued reference to FIG. 2, controller 224 may control components of manufacturing device 200; for instance, controller 224 may control elements including without limitation tool changer to switch endmills, spindle or gear systems operatively coupled to spindle to regulate spindle rotational speed, linear movement of manufacturing tool 204, base table 212, or both. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Controller may be configured to initiate manufacture of an additively manufacture body of material and/or discrete object as described in further detail below. Persons skilled in the art, upon reading the entirety of this disclosure, will be aware of similar automated control systems usable for various forms of additive manufacturing.

Still referring to FIG. 2, controller may be configured to perform any manufacturing modeling and/or other method step as disclosed herein, including without limitation as described herein. In an embodiment, controller 224 is configured to receive at least a graphical model of a plurality of structures, receive at least a graphical representation of at least an interconnecting portion, the at least an interconnecting portion connecting at least a first structure of the plurality of structures to at least a second structure of the plurality of structures, and generate a graphical representation of an additively manufacture body of material, as a function of the graphical model of the plurality of structures, and the graphical representation of the at least an interconnecting portion.

Figure 3:
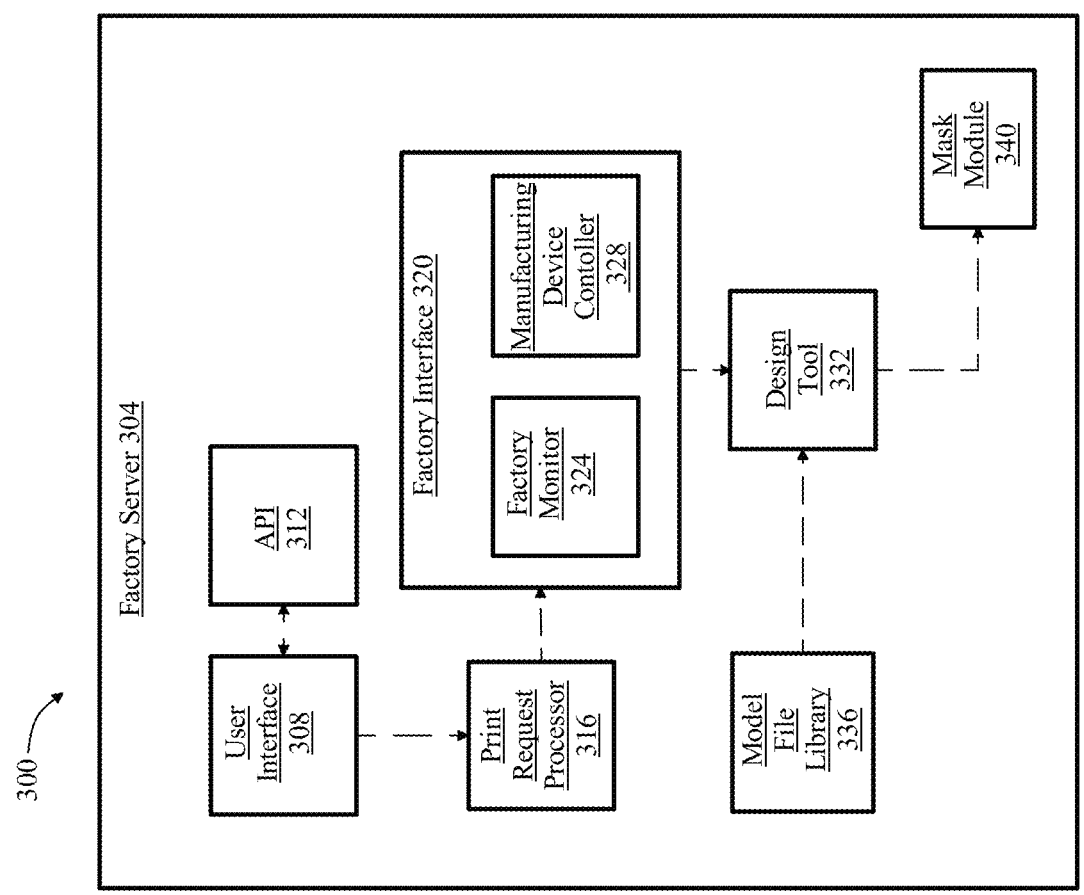
FIG. 3 is a block diagram illustrating an exemplary embodiment of a factory server.

Referring now to FIG. 3, a block diagram illustrating an exemplary embodiment of a factory server is presented. System 300 may include a factory server 304. The factory server 304 may include a non-transitory, computer-readable storage medium (i.e., a memory) storing the computer program instructions and one or more processors for executing the computer program instructions to cause the factory server 304 to perform functionality associated with the program modules. For example, the memory includes one or more read-access memories, flash memories, or hard disk memories, or a combination thereof; and the processor includes one or more central processing units (CPUs), graphics processing units (GPUs), application-specific integrated circuits (ASICs), or a combination thereof. The memory may include other technologies, such as a quantum memory storing photonic quantum information. The factory server 304 may include one or more servers operated at one or more locations. In some embodiments, the factory server 304 uses cloud computing services. A person of ordinary skill in the art would appreciate the factory server as a computing device as described herein.

With continued reference to FIG. 3, the factory server 304 may include a computer program instructions for program modules wherein system 300 may include the factory server 304 to include a user interface 308. User interface 308 may enable a user to place mask requests or other part requests with the factory server 304. The user interface 308 may present fields to request parameters of the part request from a user, which the user interface 308 may send to the factory server 304 through API 312. API 312 may include a connection between computers or between computer programs. It may be a type of software interface, offering a service to other pieces of software. API 312 may further include a document or standard that describes how to build such a connection or interface which may include, but not limited to, an API specification, and the like. A computer system that meets this standard is said to implement or expose an API. The term API may refer either to the specification or to said implementation. In contrast to a user interface, which connects a computer to a person, an API may connect computers or pieces of software to each other. In a non-limiting embodiment, API may not be intended to be used directly by a person other than a computer programmer who is incorporating it into software. An API may often made up of different parts which act as tools or services that are available to the programmer. A program or a programmer that uses one of these parts may call that portion of the API. The calls that make up the API may also be known as subroutines, methods, requests, endpoints, and the like. An API specification may further define these calls, meaning that it explains how to use or implement them. In a non-limiting embodiment, user interface 308 may include a point of human-computer interaction and communication in a device. This may include, but not limited to, display screens, keyboards, a mouse and the appearance of a desktop. For instance, user interface may also include the way through which a user interacts with an application or a website. In some implementations, a user may directly interact with the factory server 304 through the API 312 without using the user interface. In a non-limiting embodiment, the user interface 308 may present information (e.g., estimated part price, estimated completion date) queried from the factory server 304 using the API 312. API 312 may be used to, but limited to, include a computer that can perform thousands, perhaps millions, of different tasks that a programmer may wish to use. These tasks range from the most basic to the enormously complex. An API may divide and organize the world of computing tasks in a particular way. In some embodiments, the user interface may include a web page containing instructions for a browser of the user device 104 to present the user interface. In some embodiments, the user interface may include an application native to an operating system of the user device 104.

Still referring to FIG. 3, the user interface 308 may offer two modes for users to place part requests: (1) direct print and (2) quotation request. For example, a user interface 308 may present a user with a first option to upload a file for direct printing and a second option to request a quote for a project. In the direct print mode, the user interface 308 may accepts request parameters including one or more of user contact information, a model file, model file scale (e.g., distance units), image datum (e.g., two-dimensional images, three-dimensional point clouds, etc.), measurements, part quantity, part color, and part material. The user interface 308 may query the factory server 304 for an order price, which may be a set amount or may be based at least in part on the estimated amount of material used, expected print time, number of parts, or a combination thereof. The amount of material used may be estimated from part surface area, part volume, dimensions of a rectangular prism bounding the part, print resolution, other print settings, or a combination thereof. The order price is presented to the user in the user interface. The factory server 304 may select manufacturing tools to complete the order, determine manufacturing settings, generate manufacturing instructions, and initiate fabrication of the part using the selected manufacturing tools. In some instances, this process may be completed without intervention by a factory operator. In the quotation request mode, the user interface 308 may accept one or more of the request parameters used in direct print mode as well as custom instructions. However, the factory server 304 may hold fulfilment of such a part request until further consultation with the user to confirm order price, delivery date, or the custom instructions. In one embodiment, the user interface 308 may facilitate "five-dimensional (SD) printing," where a 3D part is fabricated and finished by applying one or more images (e.g., two-dimensional (2D) images) to a surface of the 3D part. Using the user interface 308, the user may upload a model file of the part as described above, and further upload one or more images for application onto the part. The user interface 308 may enable the user to orient and place the image on a graphical model of the part generated based on the part file.

Still referring to FIG. 3, the factory server 304 may include a print request processor, where the print request processor 316 may be configured to determine print settings for a manufacturing device. Print request processor 316 may include any processor or computing device described herein. Print request processor 216 may be configured to receive a set a request from a user interface 108 and transmit the request to a factory interface 320. The print request processor 316 may verify that a model file can be fabricated, determine an orientation of fabricating the part on the build plate, generate a layout of part instances on the build plate (in embodiments where more than one part is being printed at once), and determine an overall cost of the part request based on expected costs of printing the model file. Further, the print request processor 316 may determine other manufacturing device settings such as tool head travel speed, manufacturing tool temperature, cooling equipment settings (e.g., for a fan), part infill, layer height, number of outer shells, extrusion speed, other settings (e.g., support settings, raft settings), or any combination thereof. In some embodiments, the print request processor may also generate manufacturing instructions (e.g., G-code) for a manufacturing tool based on the orientation, layout, and other machine settings.

Still referring to FIG. 3, factory server 304 may include a factory interface 320. Factory interface may include any interface described herein. The factory interface 320 may include tools for factory operators to (1) monitor order status; (2) view order details; (3) configure printing parameters including part orientation and part layout on the build plate of the manufacturing device 148; and (4) configure other manufacturing settings for the manufacturing device 148 or other manufacturing tools. In a non-limiting embodiment, factory interface 320 may illustrate order status indicates, for each order, a receipt time, an order deadline, an order type (e.g., direct print or quotation request, aka a "volume order"), a project name (e.g., part name), a username, an order status, and order statistics (e.g., number of model files, number of parts, estimated print time, etc.). The order status refers to the stage of the part in the manufacturing process. Example order statuses may include in preparation (i.e., awaiting completion of orientation selection and layout completion or model file generation), printing, post-processing (e.g., harvesting from the manufacturing device build plate, removing support material, painting, buffing, electroplating, trimming from a mold, trimming filter holes, etc.); and stalled (e.g., delayed for a higher priority order or pending user correction of an invalid model file). An order may be associated with multiple model files where the order corresponds to an object made of multiple parts each corresponding to one of the model files. For example, the order may correspond to an object larger than the printing capacity of a manufacturing device 148, so the object is fabricated by printing multiple interlocking parts. In a non-limiting embodiment, factory interface 320 may illustrate order details indicates further details about a particular order. The order details may include the information described with respect to order status as well as the shipping status (e.g., shipping carrier, delivery date, tracking information). The order details may include information about each of the model files included in the order. For each model file, the order details include a quantity to print (i.e., total quantity, or per instance of the order quantity), number completed, fabrication material (e.g., PLA (polylactic acid) plastic), color, and print time remaining.

Still referring to FIG. 3, factory interface 320 for configuring printing parameters may further include a three-dimensional model of the part layout on the build plate. The build plate may be represented by a plane with a grid, and the available print volume may be represented by a wire frame box (or other applicable shape). In one embodiment, a layout planner may determine the layout of part instances on the build plate. In another embodiment, an automated factory operator may interact with the factory interface 320 to manually generate the layout of part instances on the build plate. In this embodiment, the factory operator selects orientations for part instances from part files and places the part instances on the build plate. The factory operator may place multiple part instances from the same model file, part instances from multiple model files, or both. The interface includes part statistics about each model file, such as the volume and surface area of each mode file. The interface may include a slicer tool, which generates slices of the oriented part instance. The slices each correspond to a layer that may be printed. Generally, the slices are oriented parallel to the plane of the build plate, but other configurations are possible. The slices are used to generate manufacturing instructions (e.g., G-code) that the manufacturing tool uses to manufacture the part. In a non-limiting embodiment, factory interface 320 for configuring other manufacturing settings may include settings specific to a manufacturing tool. For a manufacturing device 148, the device settings may include an extruder temperature (i.e., temperature of plastic extruded from the print head onto the build plate and part layers); a manufacturing device head travel speed in the lateral direction (parallel to the build plate); a manufacturing device head travel speed in the vertical direction (perpendicular to the build plate); a fan speed (for cooling the printhead and printed part layers); and a minimum amount of time per layer (e.g., to ensure sufficient cooling of an extruded layer before application of a subsequent layer). Other manufacturing settings are possible depending on the manufacturing tool.

Still referring to FIG. 3, the factory interface 320 may include a factory monitor 324. Factory monitor 324 may include a computer monitor which may further include any output device that displays information in pictorial form. A monitor may comprise a visual display, circuitry, casing, power supply, or combination thereof. In an embodiment, factory monitor 324 may be connected to a computer via video graphics array (VGA) connector, Digital Visual Interface (DVI), high definition multimedia interface (HDMI), DisplayPort, USB-C, low-voltage differential signaling (LVDS) or other proprietary connectors and signal. Factory monitor 324 may include a graphical user interface (GUI). In a non-limiting embodiment, interaction of user with GUI may be through an input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, an inceptor stick, and any combinations thereof. GUI may receive input from user through standard I/O interface such as ISA (Industry Standard Architecture), PCI (Peripheral Component Interconnect) Bus, and the like. GUI may receive input from user through standard I/O operation. In one embodiment, GUI may further receive input from user through optical tracking of motion. In one embodiment, GUI may further receive input from user through voice-commands. GUI may further use event-driven programming, where event listeners are used to detect input from user and trigger actions based on the input. In a non-limiting embodiment, factory monitor 324 may determine the tool status of manufacturing devices 148 and other manufacturing tools. In a non-limiting embodiment. The status of a manufacturing device 148 may include time remaining to complete a part (e.g., based on number of layers or volume completed out of total volume or layers); tool errors; or material remaining (e.g., length of plastic material remaining in spool, color of plastic material loaded).

Still referring to FIG. 3, factory interface 320 may include manufacturing device controller 328. Manufacturing device controller 328 may include any controller described herein. The manufacturing device controller 328 may control manufacturing devices 148 and other manufacturing tools based on the tool status collected by the factory interface 320 and instructions from factory operators including automated operators. The manufacturing device controller 328 may select a manufacturing device 148 to complete parts based on the tool status determined by the factory interface 320 and/or at least a print request processor 316. For example, the manufacturing device controller 328 selects manufacturing devices 148 based on availability (e.g., status as idle or printing), time until availability (based on time remaining on a printing part and turnaround time), or both. As another example, the manufacturing device controller 328 selects manufacturing devices based on material (or material color) supplied to a manufacturing device 148 as well as material or material color specified in a part request. The manufacturing device controller 328 may send the selected manufacturing devices 148 (or other manufacturing tools) manufacturing instructions to initiate fabrication. For example, the manufacturing instructions are G-code generated based at least in part on orientation and layout determined by the request processor 316, the factory interface 320, or a combination thereof.

Still referring to FIG. 3, the factory server 304 may include design tool 332. Design tool 332 may receive a design request through the user interface 320 and at least the manufacturing device controller 328 and presents the design request to a designer that may include using a factory client 112 which may automatically prepare a model file to fulfill the design request. Design tool 332 may include any hardware and/or software which may include a process of using software/hardware to create a mathematical representation of a 3-dimensional object or shape. The created object may be used for computer-generated (CG) design. The design tool 332 may facilitate design by automatically extracting features from the design request and identifying images and model files having these features. Identified images or model files may be presented to a user, who can select one or more of the presented images or model files. Images or model files selected by the user (or identified by the design tool 332) are presented to the designer, thereby reducing designer time to prepare a model file to fulfill the design request.

Still referring to FIG. 3, the factory server 304 may include model file library 336. Model file library 336 may include any library that may be configured to store and/or retrieve a plurality of data. The model file library 336 may contain 3D model files of parts and, optionally, image files of fabricated parts. The 3D model files (and image files) may be tagged with features. The design tool 332 may receive the model file library 336 as a query using features to identify 3D model files, image files, or both that are relevant to a design request.

Still referring to FIG. 3, factory server 304 may include mask module 340. The mask module 340 may be configured to use a design tool 332 which may include software and/or hardware components for the manufacturing of a custom face mask. In a non-limiting embodiment, design tool 332 may be a software system that may be configured to run on a manufacturing device 148. The mask module 340 may be used to create a custom face mask. A custom face mask may include a covering for an individual's face that blocks facial openings (e.g., the individual's mouth and nose) from being exposed to or expelling airborne particles that may spread infections in an open environment. Airborne particles include saliva droplets that may carry respiratory illnesses that spread through sneezing, coughing, and talking. The custom face mask may be designed to sit flush and comfortably on an individual's face given the individual's unique facial geometry. The mask module uses image datum to create a mold based on the individuals' facial geometry and generates instructions to thermoform a transparent plastic component to the mold.

Figure 4:
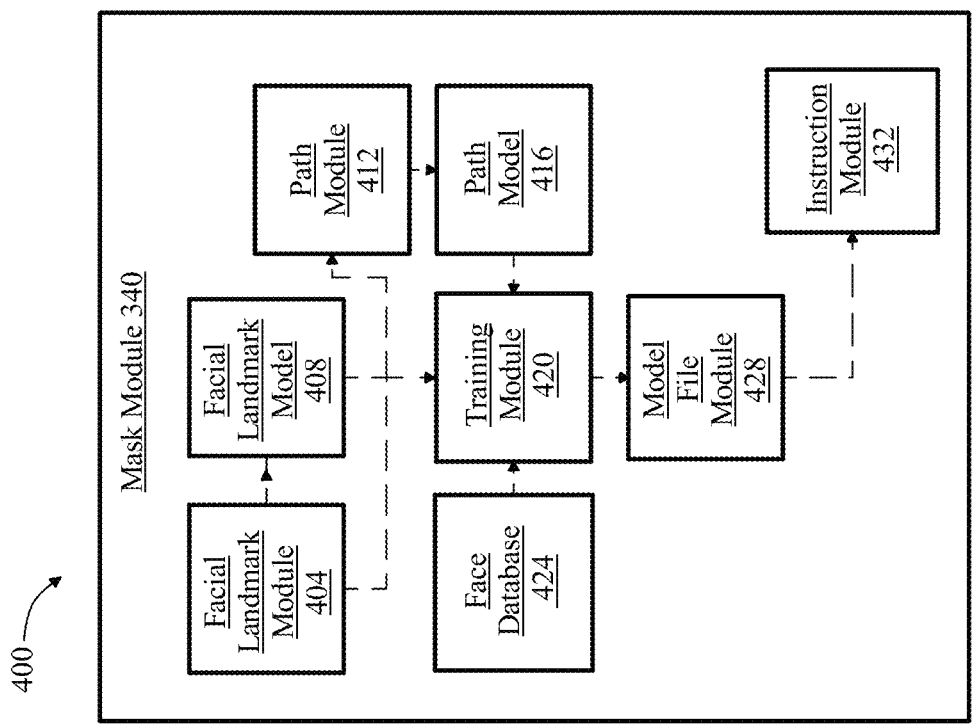
FIG. 4 is a block diagram illustrating an exemplary embodiment of a mask module.

Now referring to FIG. 4, a block diagram illustrating an exemplary embodiment of a mask module 340 is presented. System 400 may include mask module 340 wherein mask module 340 may include any mask module described herein. Mask module 340 is configured to include a facial landmark module 404. Facia landmark module 404 may be configured to map a plurality of facial landmarks to a 3D mesh. Facial landmark may include any facial landmark described herein. In a non-limiting embodiment, facia landmark may include a plurality of features of a user's facial geography including, but not limited to, the tip of the nose, indents in the chin, or dimples. The facial landmark module 404 receives image datum from a user device 104, which may be used to capture image datum via a 3D scanning application, transmit image datum, or both. The image datum describes an individual's face and may be a 3D scan point cloud or a one or more 2D images. A 3D scan point cloud may include a three-dimensional digital representation of an object (e.g., the individual's face) and may be captured via a mobile application that uses photogrammetry to compile images at varying angles into a 3D scan point cloud. The facial landmark module 404 may convert the image datum to a 3D mesh, also known as a triangulated mesh, using a meshing algorithm or photogrammetry combined with a meshing algorithm. A 3D mesh may include a 3D model representing the structure of an object. The 3D mesh may include polygons including a plurality of edges, vertices, and faces. In some embodiments, the image datum may already be a 3D mesh, and the facial landmark module 404 does not convert the image datum. In other embodiments, the facial landmark module uses the 3D scan point cloud instead of a 3D mesh to determine facial landmarks. 3D mesh may include any 3D mesh described herein. Facial landmark module 404 may additionally receive facial measurements of a user's face from a user device 104 entered by a user's hand. The facial measurements may be used to augment the 3D mesh. Other feature sets that may be used by the facial landmark module 404 may determine facial landmarks include measurements of metrics from the image datum (e.g., RGB data, curvature, distances, gradients, etc.), an entire 3D scan point cloud of the individual's face, and/or images used by the facial landmark module 404 to generate a 3D approximation of the individual's face. Further, in some embodiments, the facial landmark module 404 may generate the 3D mesh based only on facial measurements of the user's face received from the user device 104. facial measurements may include, but not limited to, a distance between the eyes and length of a node bridge.

With continued reference to FIG. 4, mask module 340 may include facial landmark model 408. mask module 340 may configured the facial landmark module 404 to input a 3D mesh (or other image datum) into the facial landmark model 408. The facial landmark model 408 may include a machine-learning model trained to map facial landmarks to 3D meshes. The facial landmark module 404 may receive from the facial landmark model 408, at least a plurality of facial landmarks that may be mapped to the 3D mesh. For example, specific vertices, edges, or faces of the 3D mesh may be labelled with corresponding facial landmarks. Training the facial landmark model 408 is described in relation to the training module 420. In some embodiments, the facial landmark module 404 may alternatively input the 3D mesh into an algorithm that finds facial landmarks based on well-defined characteristics of faces. For example, the algorithm may look for local maxima of the 3D mesh to find the tip of the individual's nose or calculate curvature or spread. A person of ordinary skill in the art would appreciate a machine-learning model being trained to map a 3D mesh of a face of a user as described herein.

With continued reference to FIG. 4, mask module 340 may include path module 412 configured to map a path to a 3D mesh based on a plurality of facial landmarks as a function of at least the facial landmark model 408 and/or at least the facial landmark module 404. A path represents a continuous boundary of a custom face mask on an individual's face. The path, once mapped to a 3D mesh, may form an outline of where the custom face mask will be in contact with the individual's face to maintain a seal with and sit flush against the individual's face. The path module 412 may receive a 3D mesh mapped with facial landmarks from the facial landmark module 404. The path module 412 may include inputs including, but not limited to, the 3D mesh (or other image datum) and outputs a path model 416, which may include a machine-learning model. The machine-learning model may include, but not limited to, a linear regression model, that may be trained to map a path to a 3D mesh with facial landmarks. The path may be pre-selected by a factory operator, mask designer, automated operator, and the like, and the pre-selected path is used by a training module 420 to train the path model 416 to map the path to 3D meshes. In a non-limiting embodiment, the path module 412 may use one or more algorithms to calculate positions of the facial landmarks, curvature, and spread to map the path to the 3D mesh instead of or in addition to using the path model 416. In a non-limiting embodiment, the path may not lie on the surface of the 3D mesh, so the path module 412 may refine the path. The path module 412 may map the path to the 3D mesh using a nearest neighbor method or ray casting. The path module 412 may also interpolate between existing points in the path either uniformly or dynamically. Further, the path module 412 may adjust the path based on defined characteristics of human faces, such as the point of the nose being between the eyes or the symmetry between each side of the user's face.

With continued reference to FIG. 4, system 400 may include training module 420 that may be configured to train at least the facial landmark model 408 and at least the path model 416. The training module 420 may train either machine learning model using deep learning, linear regression, or any other suitable machine-learning training method. In a non-limiting embodiment, one or more of the facial landmark model 408 and the path model 416 may be stored external to the factory server 120, and the factory server 120 accesses the facial landmark model 408 and the path model 416 a network when fabricating a custom face mask. The machine-learning models may be trained external to the factory server 120.

With continued reference to FIG. 4, The training module 420 accesses a set of 3D meshes from the face database 424. In some embodiments, the training module 420 retrieves other image datum describing faces from the face database 424 to train the facial landmark model 408 with. Face database 424 The face database 424 may include 3D meshes of a plurality of faces with different distributions of facial landmarks. The faces are representative of a diverse population of individuals with a variety of face shapes and facial expressions. The plurality of 3D meshes may be mapped with facial landmarks and a path and may have point-to-point vertex correspondence. The path may be a standard pre-selected path representing a recommended outline of a face mask on a face. To train the facial landmark model 408, the training module 420 inputs the set of 3D meshes with the facial landmarks to the facial landmark model 408, and the facial landmark model 408 uses this set of 3D meshes to learn which portions of 3D meshes correspond to facial landmarks. To train the path model 416, the training module 420 inputs the set of 3D meshes with the mapped paths to the path model 416, and the path model 408 uses this set of 3D meshes to learn how to map the path to other 3D meshes. The training module 420 may be configured to output a set of data that may include a 3D mesh to a model file module 428.

With continued reference to FIG. 4, system 400 may include a model file module 428 configured to generates a model file of a mold based on a mapped path extracted from a 3D mesh as a function of the training module 420. The model file may describe a geometry of a mold for a plastic component of the custom face mask based on the path mapped to the 3D mesh. The mold, once printed, is used to shape the plastic component, which is made of transparent thermoplastic and sits at the front of the individual's face to block airborne particles. In a non-limiting embodiment, the plastic component may be made of metal or another malleable material. The mold is printed with resins or thermoplastics that can withstand the high temperatures used for thermoforming. The model file may be a computer aided design (CAD) model, a stereolithography (STL) model, or the like. The model file module 428 may also generate model files of one or more other components of the custom face mask to be printed. For instance, the model file module 428 may generate a model file of a filter housing for a filter or a mask housing for a plastic component based on the path. The mask housing may line the plastic component and may include strap holes to attach a strap to the custom face mask. In a non-limiting embodiment, the model file module 428 may generate a model file of the plastic component to an instruction module configured to be instruct a manufacturing device to manufacture and/or thermoform the plastic component.

With continued reference to FIG. 4, system 400 may include an instruction module 432 configured to receive a model file from the model file module 428 and instruct a manufacturing device. The instruction module 432 may generate manufacturing instructions for one or more manufacturing devices to create the custom face mask. As described in relation to the factory server 116, the instruction module 432 may convert one of more model files from the model file module 428 into manufacturing instructions usable by a particular type of manufacturing device (e.g., thermoformer) to fabricate the part. For instance, the instruction module 432 may convert a model file of the mold for the plastic component into manufacturing instructions for the manufacturing device to print the mold. The instruction module 432 may generate manufacturing instructions for a thermoformer to thermoform the plastic component to the mold and manufacturing instructions for a CNC to trim the plastic component from the mold. In a non-limiting embodiment, the instruction module 432 may also generate manufacturing instructions for the CNC to trim filter holes for the filters from the plastic component, manufacturing instructions for the manufacturing device or other manufacturing devices to create the mask housing or filter housings, and/or manufacturing instructions for one or more robotic manufacturing tools to configure the custom face mask using the plastic component, mask housing, filters, and filter housings. In a non-limiting embodiment, the thermoforming or trimming of the plastic component may be done manually. In a non-limiting embodiment, the thermoforming or trimming may be performed automatically by at least a manufacturing device or system. The instruction module 432 may send the manufacturing instructions to respective manufacturing device or devices and may store the manufacturing instructions in an instruction database.

Figure 5A:
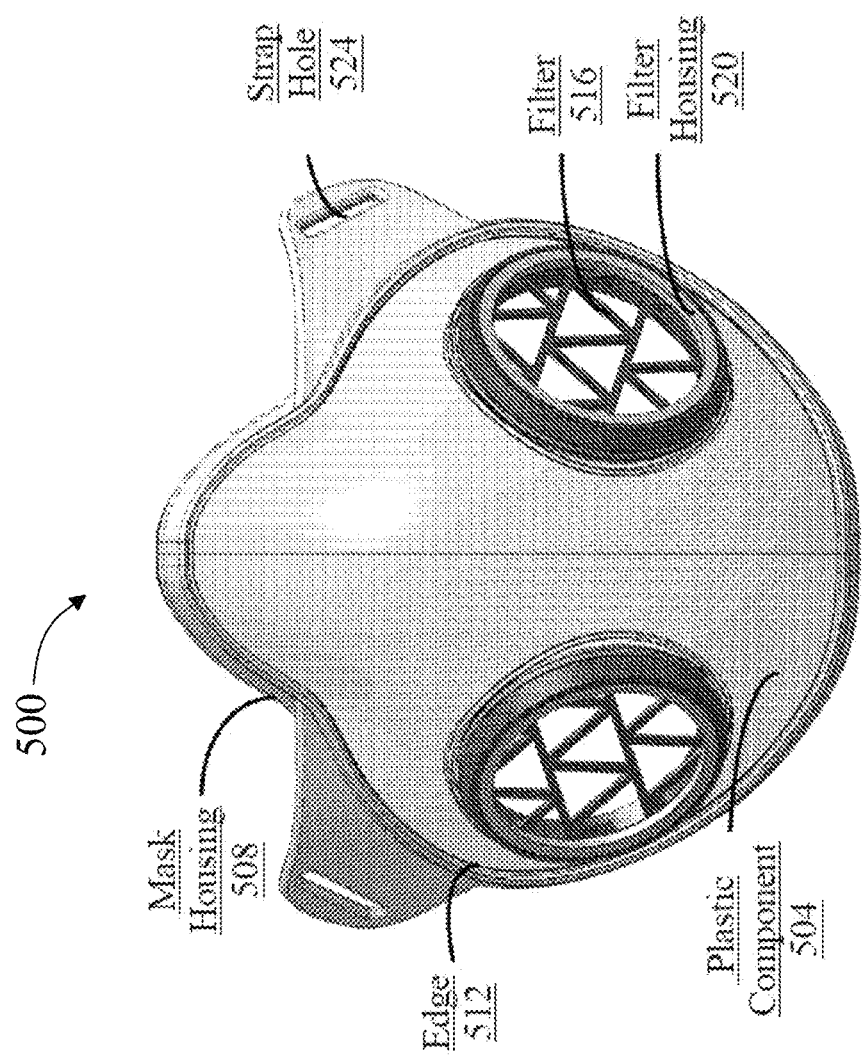
FIG. 5A is a front view of an exemplary embodiment of a custom face mask.

Referring now to FIG. 5A, a front view of an exemplary embodiment of a custom face mask 500 is presented. Custom face mask 500 may include a plastic component 504.

The plastic component 504 may include a dome shape, concave shape, and the like. The plastic component 504 may be made of materials including, but not limited to, flexible, optically transparent material that is heat-resistant and sterilizable, or combination thereof. In a non-limiting embodiment, materials of the custom face mask may include glycol-modified polyethylene terephthalate (PETG), polycarbonate, and the like. The plastic component 504 may be held on its edge 512 by the mask housing 508 which may include one or more filter holes for filters 516.

Still referring to FIG. 5A, the edge 512 of a custom face mask 500 may include any outer edge encompassing the custom face mask 500. In a non-limiting embodiment, the edge 512 may include, but not limited to, a casing that may be thicker in width than the rest of the custom face mask for a user to easily see and/or hold with a hand. Custom face mask 500 may further be held by the mask housing 508 which may include, but not limited to, a protective casing surrounding the edge 512 of the custom face mask 500. In a non-limiting embodiment, mask housing 508 may come directly in contact with a user's face on the boundary of the user's face surrounding the user's nose and mouth. Custom face mask 500 may include at least a filter 516. The filters 516 may be configured to be replaceable and may be made of filtering material. Filter 516 may include a plurality of layers of filtering materials. Filtering materials may include, but not limited to, industry-grade spunbond polypropylene, meltblown polypropylene, spunlace polypropylene, and the like. A person of ordinary skill in the art would appreciate the various types of polypropylene in the context of filtering. In a non-limiting embodiment, an automated manufacturing device or thermoformer may manufacture or thermoform single and double layers of any type of polypropylene. Thermoformer may use a fabric with a rating of 68 grams per square meter, or two layers of a less dense one. The material may be integrated as a middle layer when masks are being made.

With continued reference to FIG. 5A, each filter 516 of custom face mask 500 may be held in a filter housing 520, which sits in a filter hole in the plastic component 504. Filter housing 520 may include, but not limited to respirator cartridges, filters, and the like. Respirator cartridge is a type of filter that removes gases, volatile organic compounds (VOCs), and other vapors from breathing air through adsorption, absorption, or chemisorption. It is one of two basic types of filters used by air-purifying respirators. Respirator cartridge may also be a mechanical filter, which removes only particulates. Volatile organic compounds (VOC) are organic chemicals that have a high vapor pressure at room temperature. High vapor pressure correlates with a low boiling point, which relates to the number of the sample's molecules in the surrounding air, a trait known as volatility. VOC's are responsible for the odor of scents and perfumes as well as pollutants. VOCs play an important role in communication between animals and plants, e.g. attractants for pollinators, protection from predation, and even inter-plant interactions. Some VOCs are dangerous to human health or cause harm to the environment. Anthropogenic VOCs are regulated by law, especially indoors, where concentrations are the highest. Most VOCs are not acutely toxic, but may have long-term chronic health effects. In a non-limiting embodiment, filter housing 520 may be configured in combination with filter 516 to prevent VOCs from entering the mouth and nose of a user. The filers 516 shown may be configured to be placeholder renderings, while the actual filters 516 may include pieces of fabric interchangeably inserted into the filter housings 520. The filters 516 may be removed from the custom face mask and replaced. The filter housings 520 and the mask housing 508 may be printed by the manufacturing device using a variety of resins or thermoplastics, such as PETG or acrylonitrile butadiene styrene (ABS), created using injection molding, or mass-produced by a different manufacturing tool. The filter housings 520 and mask housing 508 may include variety of colors, shapes, and/or patterns selected by the customer when requesting the custom face mask from the factory server 116. In some embodiments, the face mask may also include a strap connected through the strap holes 524 of the mask housing 508.

With continued reference to FIG. 5A, custom face mask 5A may include a strap hole 524. Strap hole 524 may include any hole or opening on a plastic component, edge, mask housing, or combination thereof. Strap hole 524 may be configured to allow a fabric, material, strap, and the like, to be inserted through and wrap around a user's head and into a second strap hole on the custom face mask 500. In some embodiments, the custom face mask may not include a mask housing 508, and the strap may be connected directly to the plastic component 504. The strap is made of fabric or elastic material and is configured to secure behind the customer's head or behind the customer's ears. The strap may be adjustable, and the customer may select from a variety of colors and patterns for the strap upon requesting the custom face mask.

Figure 5B:
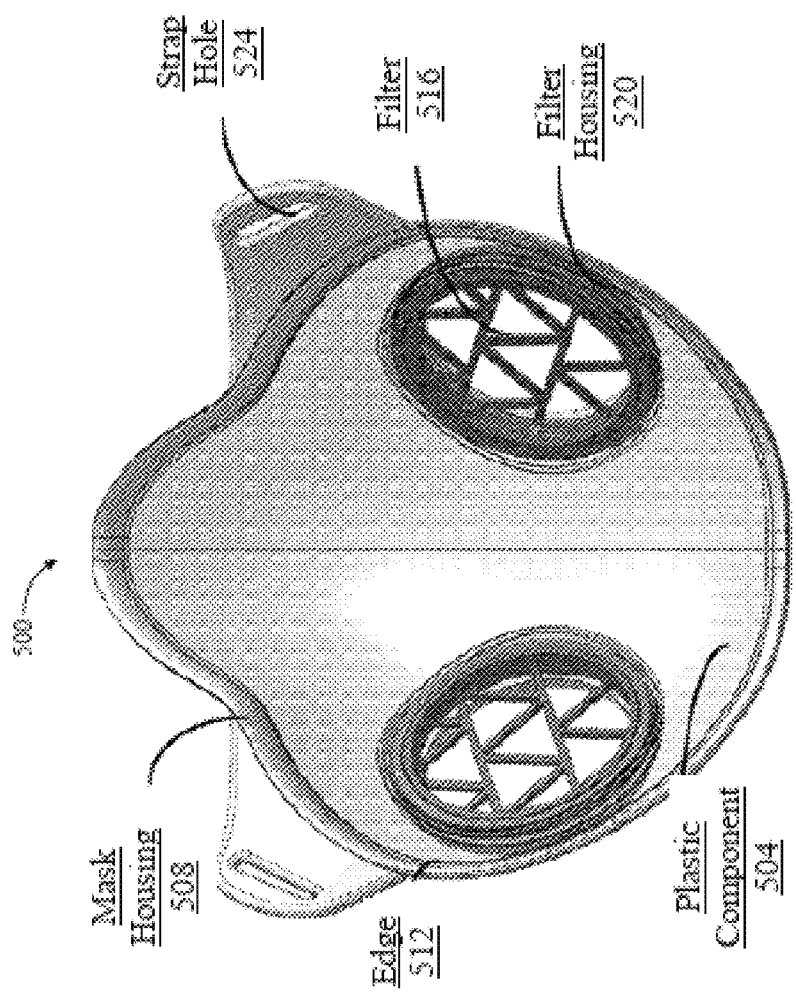
FIG. 5B is a back view of an exemplary embodiment of a custom face mask.

Referring now to FIG. 5B, a back view of an exemplary embodiment of a custom face mask 500 is presented. The custom face mask 500 may include a plastic component 504, a mask housing 508, at least a filter 516, at least a filter housing 520, and at least a strap hole 524. Custom face mask 500 may be washable and reusable. Plastic component 504 may include any plastic component described herein. Mask housing 508 may include any mask housing described herein. Filter 516 may include any filter described herein. Filter housing 520 may include any filter housing described herein. Strap hole 524 may include any strap hole described herein. A person of ordinary skill in the art would appreciate components of a custom face mask described herein.

Figure 5C:
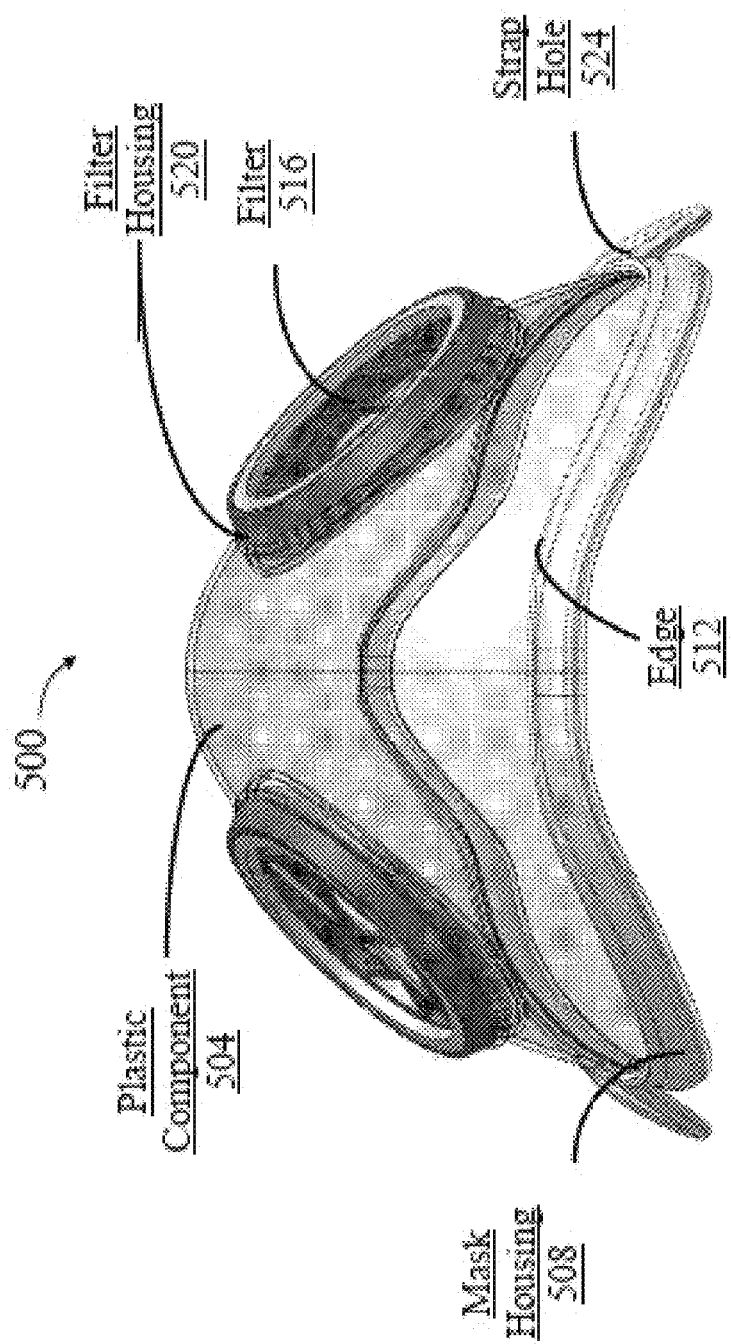
FIG. 5C is a bottom view of an exemplary embodiment of a custom face mask.

Referring now to FIG. 5C, a bottom view of an exemplary embodiment of a custom face mask 500 is presented. The custom face 500 mask may include a plastic component 504, a mask housing 508, at least a filter 516, at least a filter housing 520, and at least a strap hole 524. Custom face mask 500 may be washable and reusable. Plastic component 504 may include any plastic component described herein. Mask housing 508 may include any mask housing described herein. Filter 516 may include any filter described herein. Filter housing 520 may include any filter housing described herein. Strap hole 524 may include any strap hole described herein. A person of ordinary skill in the art would appreciate components of a custom face mask described herein.

Figure 5D:
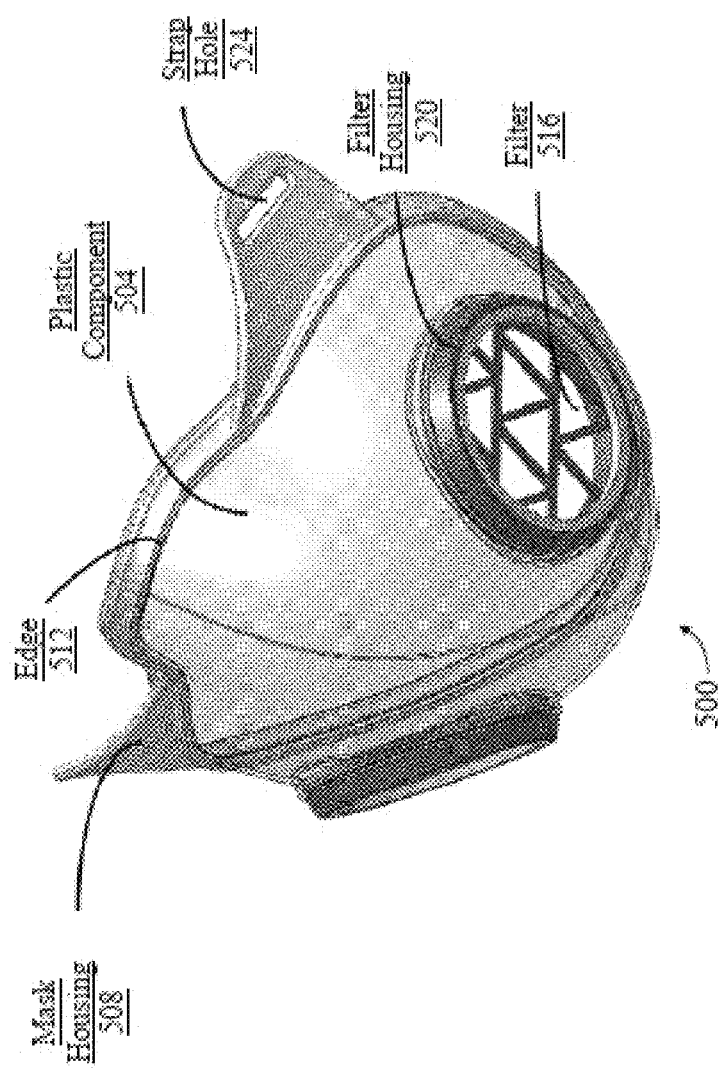
FIG. 5D is an isometric view of an exemplary embodiment of a custom face mask.

Referring now to FIG. 5D, an isometric view of an exemplary embodiment of a custom face mask 500 is presented. The custom face 500 mask may include a plastic component 504, a mask housing 508, at least a filter 516, at least a filter housing 520, and at least a strap hole 524. Custom face mask 500 may be washable and reusable. Plastic component 504 may include any plastic component described herein. Mask housing 508 may include any mask housing described herein. Filter 516 may include any filter described herein. Filter housing 520 may include any filter housing described herein. Strap hole 524 may include any strap hole described herein. A person of ordinary skill in the art would appreciate components of a custom face mask described herein.

Figure 6A:
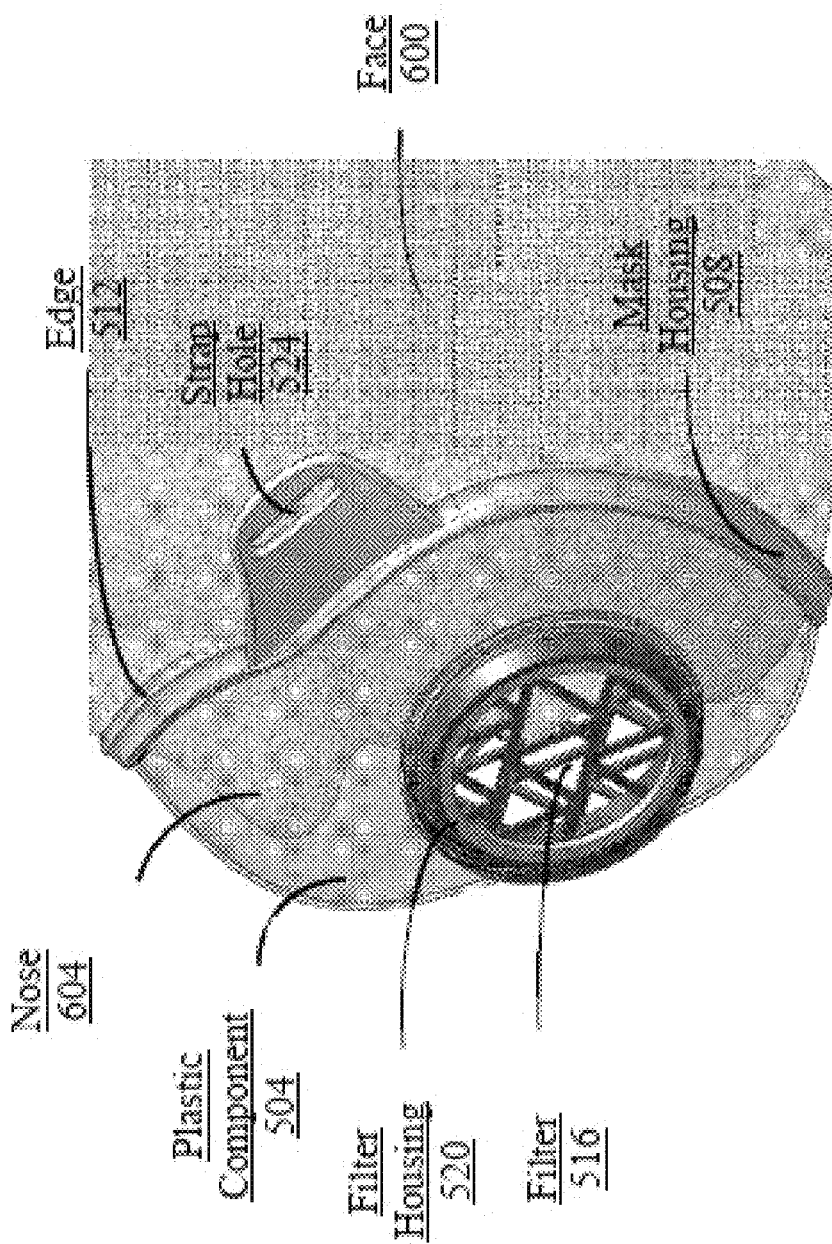
FIG. 6A is a side view of an exemplary embodiment of a custom face mask on a user's face.

Referring now to FIG. 6A, a side view of an exemplary embodiment of a custom face mask on a user's face 600 is presented. The custom face mask may include a plastic component 504, a mask housing 508, at least a filter 516, at least a filter housing 520, and at least a strap hole 524. Custom face mask 500 may be washable and reusable. Plastic component 504 may include any plastic component described herein. Mask housing 508 may include any mask housing described herein. Filter 516 may include any filter described herein. Filter housing 520 may include any filter housing described herein. Strap hole 524 may include any strap hole described herein. Custom face mask on a user's face 600 may include the custom face mask covering the nose 604 and mouth representing a boundary of a user's face 608 which may represent a portion of an image datum. In a non-limiting embodiment, the custom face mask may be placed over a user's nose 604 of a user's face 600 with space between the plastic component and the bridge of the nose 604. In a non-limiting embodiment, the custom face mask may sit on a user's face 600 to block the customer's nose 604 and mouth from expelling and being exposed to airborne particles in an open environment. The edge 512 of the plastic component 504 may further be lined with the mask housing 508 and may outline a path mapped to a 3D mesh of the face 600. This allows the custom face mask to conform to the unique geography of the user's face 600 to maintain a seal. Further, by using a transparent plastic component, the face 600 is visible while the custom face mask is being used. A person of ordinary skill in the art would appreciate components of a custom face mask as placed on a user's face described herein. A person would further appreciate the embodiment of a face mask leaving room between the surface of the face mask on the bridge of a user's nose for increase comfort.

Figure 6B:
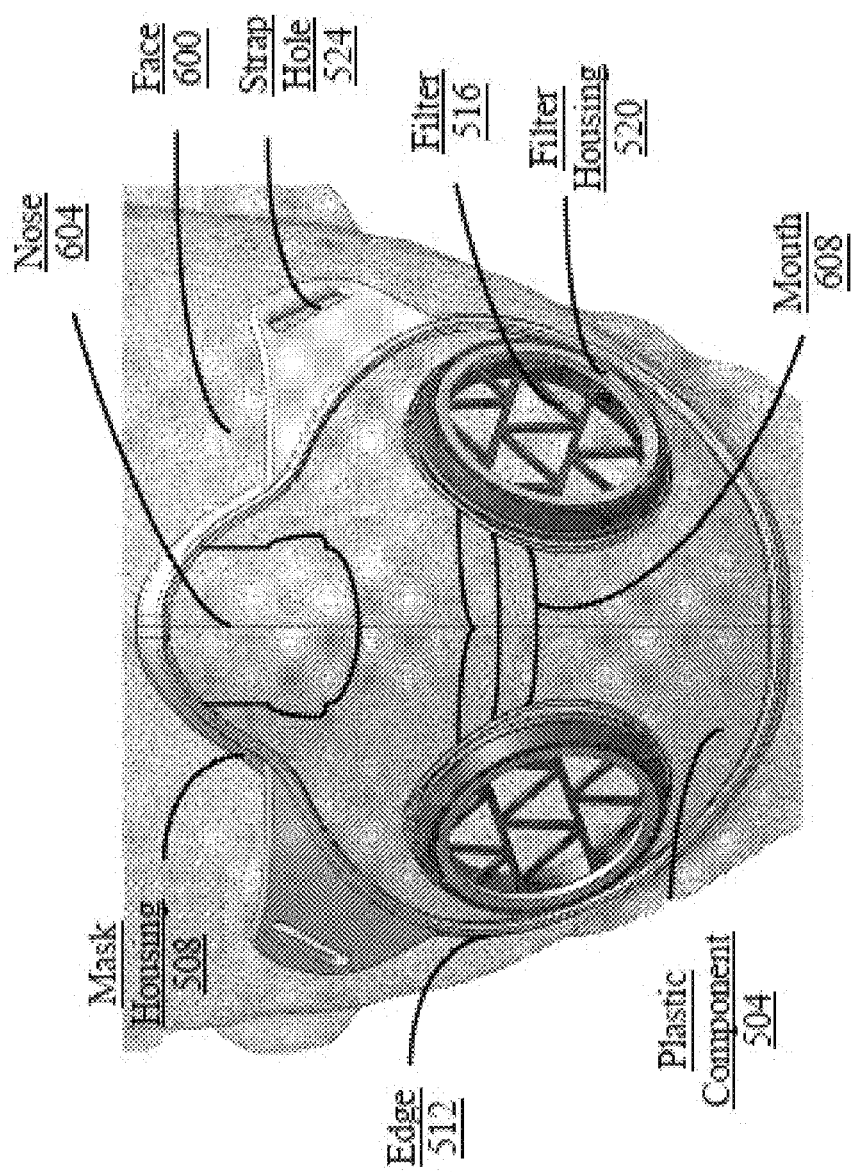
FIG. 6B is a front view of an exemplary embodiment of a custom face mask on a user's face.

Referring now to FIG. 6B, a side view of an exemplary embodiment of a custom face mask on a user's face 600 is presented. The custom face mask may include a plastic component 504, a mask housing 508, at least a filter 516, at least a filter housing 520, and at least a strap hole 524. Custom face mask 500 may be washable and reusable. Plastic component 504 may include any plastic component described herein. Mask housing 508 may include any mask housing described herein. Filter 516 may include any filter described herein. Filter housing 520 may include any filter housing described herein. Strap hole 524 may include any strap hole described herein. Custom face mask on a user's face 600 may include the custom face mask covering the nose 604 and mouth representing a boundary of a user's face 608 which may represent a portion of an image datum. A person of ordinary skill in the art would appreciate components of a custom face mask as placed on a user's face described herein.

Figure 7:
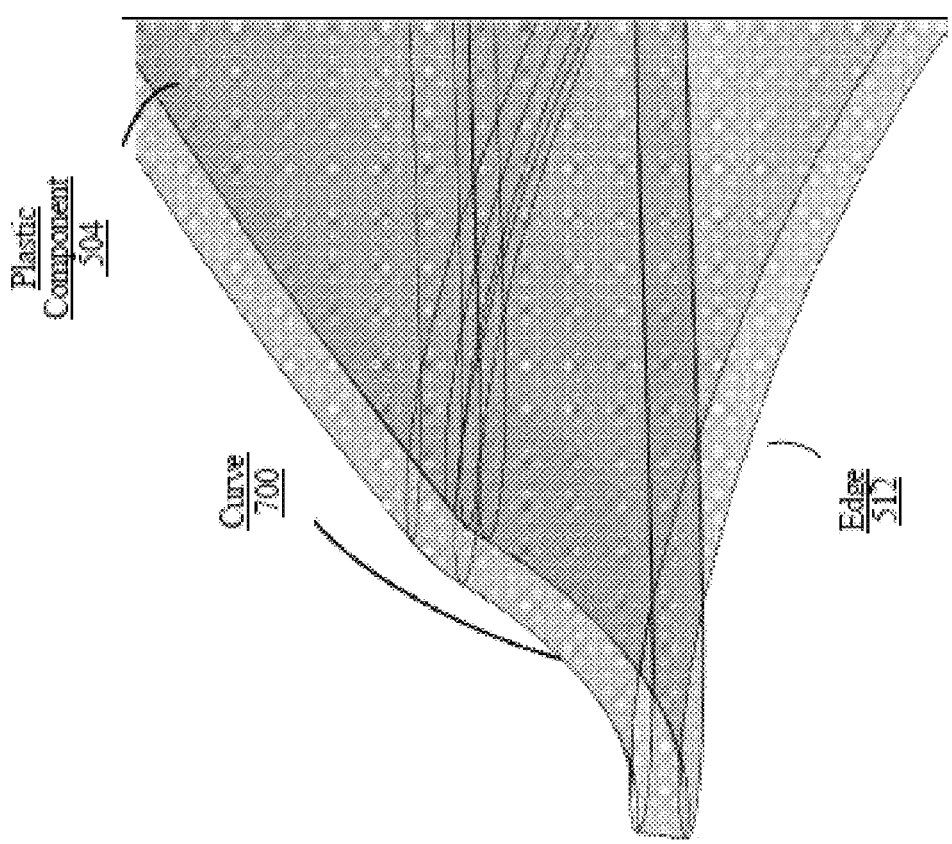
FIG. 7 is a side view of an edge of an exemplary embodiment of a custom face mask.

Referring now to FIG. 7, a side view of an edge 420 of an exemplary embodiment of a custom face mask is presented. The edge 512 of the plastic component 400 matches to a path mapped to a 3D mesh of a customer's face. The edge 512 of the custom face mask is curved. In particular, the edge 512 protrudes from the plastic component 504 into the curve 700. The curve 700 may or may not curve away from the customer's face when in use depending on the position of the individual's face relative to the custom face mask. For example, when in use, the customer's face is flat or flush against a portion of the curve 700, allowing the customer to move their face without breaking contact with the edge 512. The curve 700 also distributes pressure from the custom face mask on the customer's face to make the custom face mask comfortable for the customer.

Figure 8:
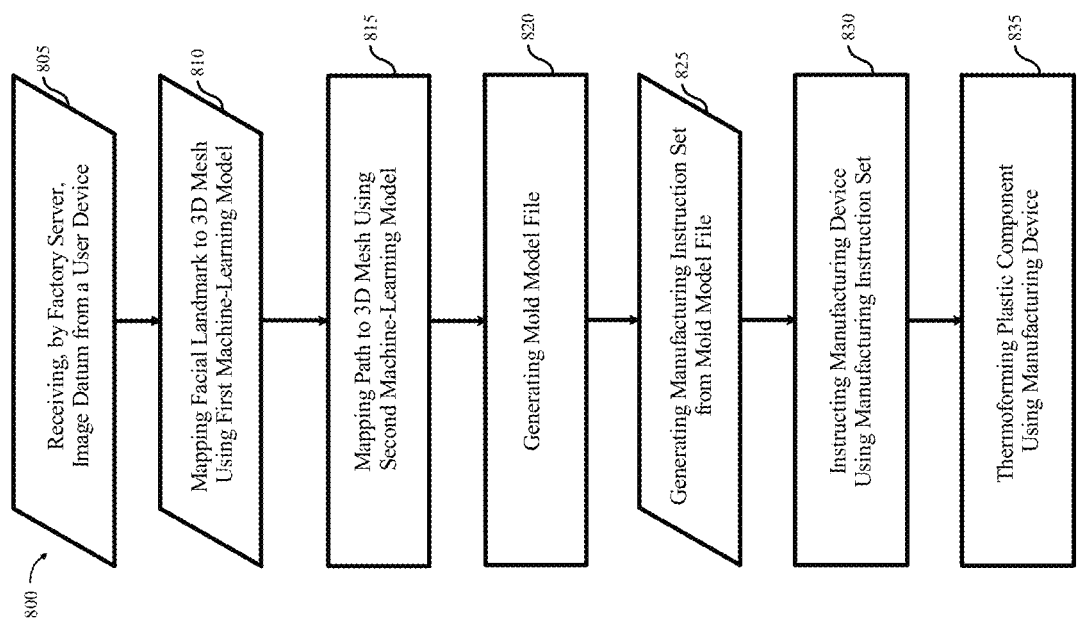
FIG. 8 is a flowchart illustrating an embodiment of a method for fabricating a custom face mask.

Referring now to FIG. 8, a flowchart illustrating an embodiment of a method 800 for fabricating a custom face mask is presented. Step 805 includes receiving, by a factory server, image datum. In a non-limiting embodiment, a user device 104 may generate an image datum 108 from a user input and transmit it to a factor server 112 as a receiver of such image datum. User input may include, but not limited to, an electronic and/or physical signal used to provide a computing device as a command. In a non-limiting embodiment, a user may user may press a button or point on a touchpad and/or screen on a user device as an input for the user device to perform a series of actions including generating an image datum and transmitting it to a factory server. User input may include computer signals. In a non-limiting embodiment, image datum may include one or more 3D scan point clouds or 2D images of an individual's face captured by a user device 104. In a non-limiting embodiment, the facial landmark module 404 may input the 3D mesh into the facial landmark model 408, which outputs facial landmarks 124 mapped to the 3D mesh. For instance, step 805 may include the receiving of image datum wherein the receiving of image datum may further include the facial landmark model 408 may to be trained by the training module 420 using image datum 108 of faces labelled with facial landmarks 124 stored in the face database 424. User device may include any user device described herein. Factory server may include any factory server described herein. Image datum may include any image datum described herein.

With continued reference to FIG. 8, method 800 includes step 810 wherein step 810 includes mapping at least a facial landmark to a 3D mesh using a first machine-learning model. In a non-limiting embodiment, a manufacturing environment including a factory client 112 may configure the factory server 116 to map a facial landmark 124 to a 3D mesh for the generation of a custom face mask using a first machine-learning model 120. In a non-limiting embodiment, the first machine may train a plurality of data including at least an image datum 108 to map at least a facial landmark 124 to the 3D mesh. In a non-limiting embodiment, a facial landmark module 404 may convert the image datum 108 into a 3D mesh of a user's face wherein the facial landmark module 404 may map facial landmarks 124 to a 3D mesh of the image datum 108 using a facial landmark model 408. 3D mesh may include any 3D mesh described herein. First machine-learning model may include any machine-learning model as described in FIG. 9.

With continued reference to FIG. 8, method 800 may include step 815 including a mapping of a path to 3D mesh using a second machine-learning model. In a non-limiting embodiment, a second machine-learning model 128 may receive training data to generate a 3D mesh path 132 for the mapping of the path to the 3D mesh. Training data that may be used to train the second machine-learning model 128 for mapping the path to the 3D mesh may further includes a plurality of 3D meshes of a plurality of faces from a plurality of users, wherein each 3D mesh includes at least a facial landmark mapped to the 3D mesh. In a non-limiting embodiment, mapping the path to the 3D mesh as a function of the second machine-learning model may include retrieving, from a database, a plurality of 3D meshes of the plurality of faces, wherein the plurality of faces includes said distribution of at least a face shape and at least the facial landmarks, determining a path for the 3D meshes, mapping the path to each 3D mesh and training the second machine learning model using at least the 3D meshes of the plurality of faces, at least the facial landmarks, and at least the mapped path to each 3D mesh. Step 815 may include receiving the mapping of facial landmark to 3D mesh from step 810 and at least the training data described herein. Step 815 may include receiving training data from image datum 108. In a non-limiting embodiment, the path module 412 may input the 3D mesh and the mapped facial landmarks to the path model 416, and the path model 416 outputs a path mapped to the 3D mesh. The training module 420 may retrieve 3D meshes or other image data of faces representative of a range of facial landmarks mapped with the path from the face database 424 and train the path model 416 on the retrieved image data. Second machine-learning model may include any machine-learning model as described in FIG. 9. Training data that may be used to train the second machine-learning model for mapping the path to the 3D mesh may further includes a plurality of 3D meshes of a plurality of faces from a plurality of users, wherein each 3D mesh includes at least a facial landmark mapped to the 3D mesh. In a non-limiting embodiment, mapping the path to the 3D mesh as a function of the second machine-learning model may include retrieving, from a database, a plurality of 3D meshes of the plurality of faces, wherein the plurality of faces includes said distribution of at least a face shape and at least the facial landmarks, determining a path for the 3D meshes, mapping the path to each 3D mesh and training the second machine learning model using at least the 3D meshes of the plurality of faces, at least the facial landmarks, and at least the mapped path to each 3D mesh.

With continued reference to FIG. 8, method 800 may include step 820 which may include generating a mold model file. In a non-limiting embodiment, a factory client 112 may generate a generate a mold model file 136 as a function of at least the first machine-learning model 120, at least the second machine-learning model 126, and at least the factory server 116 wherein the mold model file 136 may include a custom face mask mesh 140 representing a design and makeup of a custom face mask for a specific user. In a non-limiting embodiment, step 820 may include, using a model file module 428 that may use the path as mapped to the 3D mesh as an edge 512 of the plastic component 504. Step 820 may further include using the mold model file module 428 that may also generate model files for the mask housing 508 and the filter housings 520 of a custom face mask.

With continued reference to FIG. 8, method 800 may include step 825 wherein step 825 may include generating a manufacturing instruction set from a mold model file. In a non-limiting embodiment, the generating of a manufacturing instruction set may include the generating of a custom face mask mesh 140. The mold model file 136 may generated as a function of the path to the 3D mesh and the 3D mesh of an image datum. Step 825 may include the path to the 3D mesh and 3D mesh of the image datum in the generating of a manufacturing instruction set 144. Manufacturing instruction set may include any manufacturing instruction set described herein.

With continued reference to FIG. 8, method 800 may include step 830 wherein step 830 includes instructing a manufacturing device using a manufacturing instruction set. Step 830 may include instructing via an instruction module 432 for the creation of a mold representing a custom face mask. A person of ordinary skill in the art would appreciate the instructing of a manufacturing device with an instruction set.

With continued reference to FIG. 8, method 800 may include step 835 wherein step 830 may include thermoforming a plastic component using a manufacturing device. Manufacturing device may include any manufacturing device described herein. Step 835 may include the manufacturing device 148 to include a thermoformer configured to thermoform the plastic component 504 representing the custom face mask mesh 140 of the mold model file 136 from as instructed from the manufacturing instruction set 144. In a non-limiting embodiment, the instruction module 432 may instruct a thermoformer 144 to create mold of the custom face mask and may further instruct the thermoformer 144 to thermoform the plastic component 504 to the mold. In a non-limiting embodiment, the instruction file module 432 may also instruct a CNC to trim the plastic component 504 from the mold and cut filter holes for at least a filter 516 and at least a filter housing 520 into the plastic component 504. A person of ordinary skill in the art would appreciate the step of manufacturing a mold of a model in the context of fabricating a custom face mask.

Figure 9:
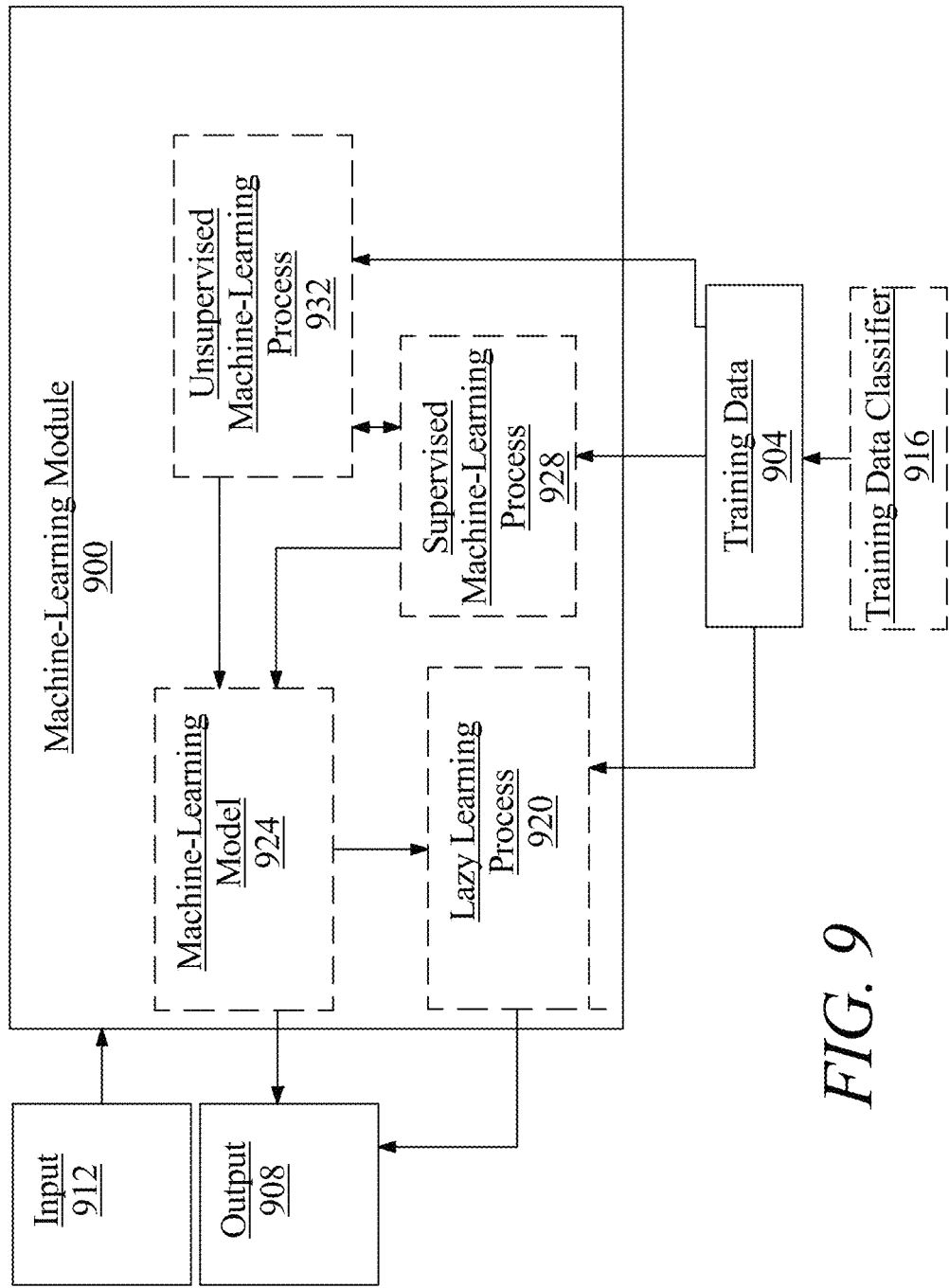
FIG. 9 is an exemplary embodiment of a machine learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example a first machine-learning model may receive at least an image datum and output at least a facial landmark. Another non-limiting illustrative example may include a second machine-learning model that may receive training data including at least an image datum, at least a facial landmark, and at least a boundary of a custom face mask.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting embodiment, a training data classifier may classify elements of training data to subcategories of facial features such as face length and/or width, nose bridge length, chin length, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
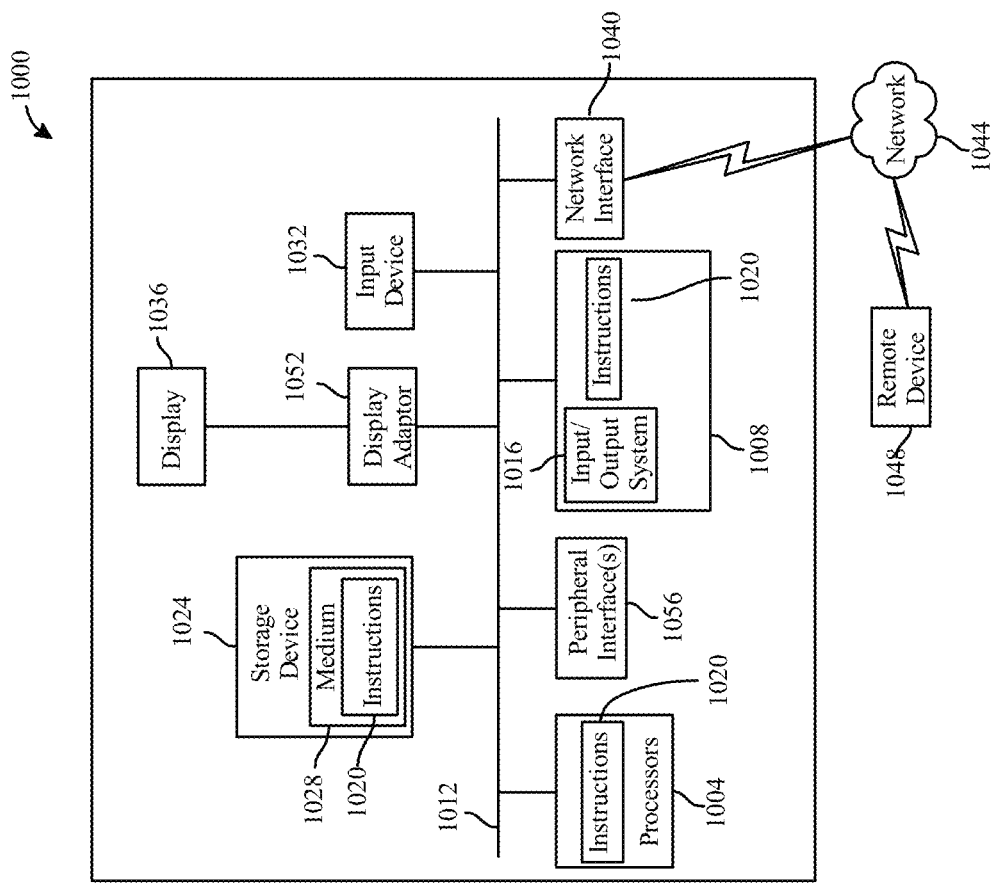
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036.

Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for fabricating a custom face mask, the system comprising:
 a factory client, factory client comprising a computing device, the computing device configured to:
  receive, at a factory server, an image datum and at least a user device, the image datum comprising a plurality of data of a face of a user;
  map, as a function of a first machine-learning model, at least a facial landmark to a three-dimensional (3D) mesh of the image datum;
  map, as a function of a second machine-learning mode, a path to the 3D mesh, the path comprising a boundary of a custom face mask configured for use on a user's face, wherein the second machine-learning model is trained using training data, the training data comprising:
   a plurality of facial landmark examples; and
   a plurality of boundary examples;
  generate a mold model file, the mold model file comprising the custom face mask mesh, as a function of the path to the 3D mesh and the 3D mesh of the image datum from the first machine-learning model and second machine-learning model;
  generate a manufacturing instruction set as a function of the mold model file and the custom face mask mesh;
  instruct a manufacturing device, manufacturing device configured to create the mold as a function of the model file; and
  thermoform a plastic component as a function of the manufacturing device.

2. The system of claim 1, wherein the custom face mask includes at least a filter and at least a filter housing.

3. The system of claim 1, wherein the custom face mask includes a mask housing.

4. The system of claim 3, wherein the mask housing configured to fit around the plastic component.

5. The system of claim 4, wherein the mask housing and at least a filter housing is printed using at least a 3D printer.

6. The system of claim 4, wherein the custom face mask further includes a strap connected to at least a strap hole in the mask housing.

7. The system of claim 1, wherein the plastic component includes a transparent plastic component.

8. The system of claim 1, wherein the plastic component includes a flexible plastic component.

9. The system of claim 1, wherein the manufacturing device includes an automated manufacturing device.

10. The system of claim 1, wherein the manufacturing device includes at least a thermoforming device.

11. A method for fabricating a custom face mask, the method comprising:
 receiving, at a factory server, an image datum, image datum comprising, a plurality of data of a face of a user;
 mapping, as a function of a first machine-learning model, at least a facial landmark to a three-dimensional (3D) mesh of the image datum;
 mapping, as a function of a second machine-learning mode, a path to the 3D mesh, the path comprising a boundary of a custom face mask configured for use on a user's face, wherein the second machine-learning model is trained using training data, the training data comprising:
  a plurality of facial landmark examples; and
  a plurality of boundary examples;
 generating a mold model file, the mold model file comprising a custom face mask mesh, as a function of the path to the 3D mesh and the 3D mesh of the image datum;
 generating a manufacturing instruction set as a function of the mold model file and the custom face mask mesh; and
 instructing a manufacturing device, manufacturing device configured to create the mold as a function of the model file.

12. The method of claim 11, wherein the image datum includes a 3D scan point clout of a user's face.

13. The method of claim 12, wherein the instructing the manufacturing device further includes instructing a computer numerical control machine (CNC), CNC configured to trim a plastic component from the mold.

14. The method of claim 13, wherein trimming the plastic component from the mold comprises:
 extracting, by the factory server, a cutting curve from the mold file, the mold file configured to represent the boundary of the custom face mask on the model file; and
 instructing the CNC to trim the plastic component as a function of the cutting curve.

15. The method of claim 13, wherein instructing CNC to trim the plastic component further includes trimming at least a filter hole from the plastic component, filter hole configured to avoid blocking at least the facial landmark.

16. The method of claim 11, wherein the training data used to train the second machine-learning model for mapping the path to the 3D mesh further includes a plurality of 3D meshes of a plurality of faces from a plurality of users, wherein each 3D mesh includes at least a facial landmark mapped to the 3D mesh.

17. The method of claim 11, wherein the mapping the path to the 3D mesh as a function of the second machine-learning model includes:
- retrieving, from a database, the plurality of 3D meshes of the plurality of faces, wherein the plurality of faces includes a distribution of at least a face shape and at least the facial landmarks;
- determining a path for the 3D meshes;
- mapping the path to each 3D mesh; and
- training the second machine learning model using at least the 3D meshes of the plurality of faces, at least the facial landmarks, and at least the mapped path to each 3D mesh.

18. The method of claim 11, wherein the instructing the manufacturing device further includes thermoforming an edge of the plastic component to protrude outward from the mold, wherein the plastic component is flush with a face when used.

19. The method of claim 11 further comprising manufacturing a plastic component of the mold using the manufacturing device.

20. The method of claim 11, wherein manufacturing further includes manufacturing a transparent plastic component.

* * * * *